US007499549B2

(12) United States Patent
Iima et al.

(10) Patent No.: US 7,499,549 B2
(45) Date of Patent: Mar. 3, 2009

(54) COMMUNICATION SYSTEM, INFORMATION PROCESSING APPARATUS, INFORMATION PROCESSING METHOD, RECORDING MEDIUM AND PROGRAM

(75) Inventors: Shin Iima, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 10/948,204

(22) Filed: Sep. 24, 2004

(65) Prior Publication Data
US 2005/0117752 A1      Jun. 2, 2005

(30) Foreign Application Priority Data
Sep. 29, 2003   (JP)   ............................. 2003-338309

(51) Int. Cl.
H04K 1/00    (2006.01)
(52) U.S. Cl. .................. 380/270; 455/41.2; 455/41.3; 455/411; 455/556.2; 455/557
(58) Field of Classification Search ................. 380/270; 455/435.1, 41.3, 556.2
See application file for complete search history.

(56) References Cited

U.S. PATENT DOCUMENTS 6,148,205 A * 11/2000 Cotton .................... 455/435.1

FOREIGN PATENT DOCUMENTS

| JP | 08-263179 | 10/1996 |
|---|---|---|
| JP | 2001-156704 | 6/2001 |
| JP | 2001-156723 | 6/2001 |
| JP | 2001-237086 | 8/2001 |
| JP | 2002-353955 | 12/2002 |
| JP | 2002-374261 | 12/2002 |
| JP | 2003-087263 | 3/2003 |
| JP | 2003-244739 | 8/2003 |
| JP | 2005-099945 | 4/2005 |
| WO | WO 03/061205 A1 | 7/2003 |

* cited by examiner

Primary Examiner—KimYen Vu
Assistant Examiner—April Y Shan
(74) Attorney, Agent, or Firm—Oblon, Spivak, McClelland, Maier & Neustadt, P.C.

(57) ABSTRACT

A portable server has an antenna and radio communicating portion having a receivable distance of several m to several tens of m and an authentication antenna and authentication radio communicating portion having a receivable distance of several mm to several cm, which is extremely shorter than the receivable distance of the radio communicating portion. When an authentication button is operated by a user and when another apparatus is arranged within a range of the receivable distance of the authentication radio communicating portion, the authentication radio communicating portion performs authentication processing with the other apparatus through the authentication antenna and registers authentication data resulting from the authentication with a memory. The radio communicating portion connects to the authenticated other apparatus through an antenna based on the authentication data and performs data communication. The invention is applicable to a radio communication system including a mobile terminal.

3 Claims, 14 Drawing Sheets

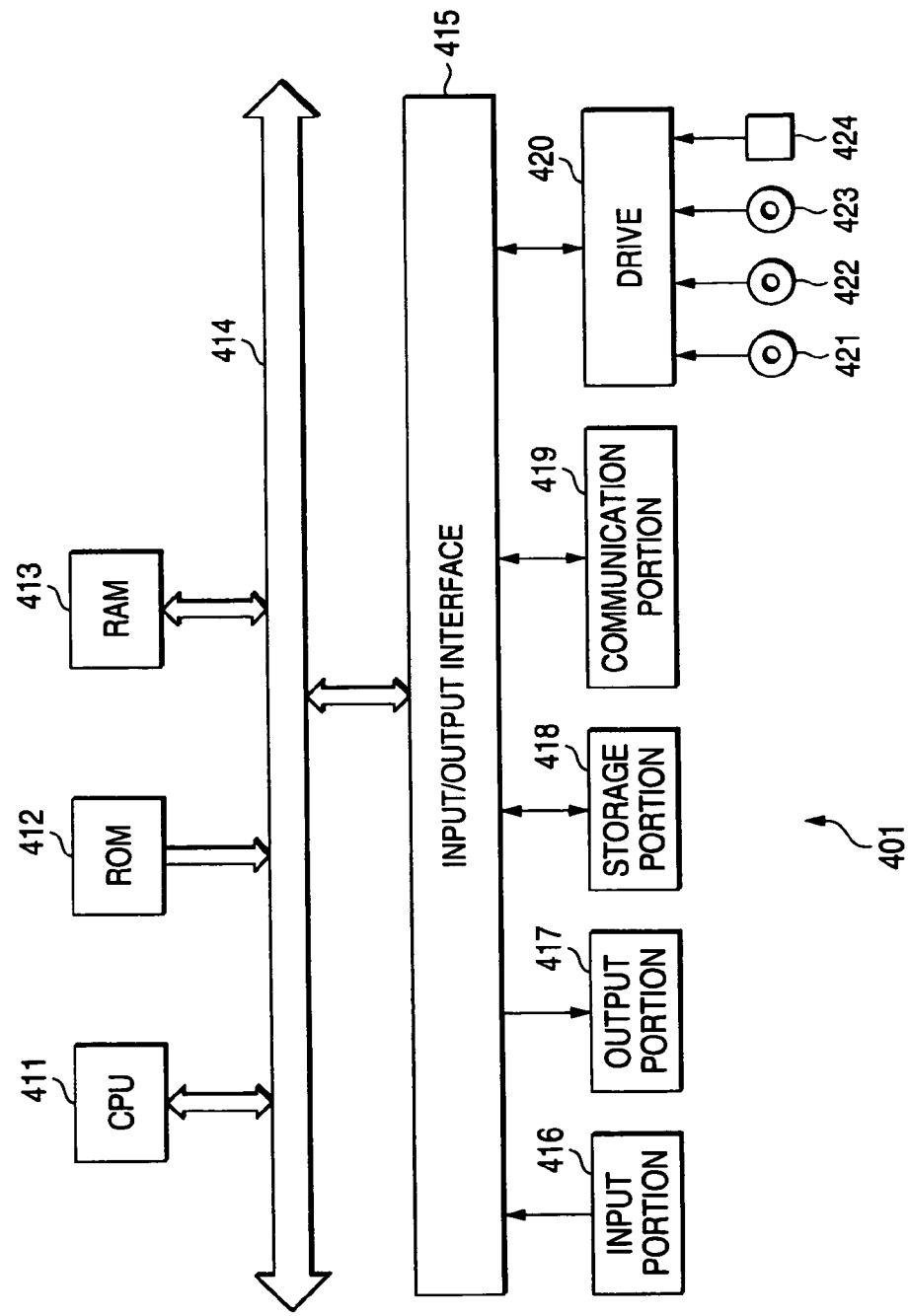

COMMUNICATION SYSTEM, INFORMATION PROCESSING APPARATUS, INFORMATION PROCESSING METHOD, RECORDING MEDIUM AND PROGRAM

BACKGROUND OF THE INVENTION

1. Field of the Invention

The present invention relates to a communication system, an information processing apparatus, information processing method, a recording medium and a program and in particular to a communication system, information processing apparatus and method, recording medium and program, which allow secure and easy mutual authentication.

2. Description of the Related Art

In recent years, with the advance of networking, more home networks are being established with an electronic apparatus, for example. In order to establish such a home network, a compliant network interface must be implemented in an electronic apparatus at home, which may increase costs or may complicate wiring of cables to be connected thereto. Therefore, the establishment of a home network by radio communication has been proposed.

When a network is established by radio communication in this way, mutual authentication of electronic equipment requesting to connect to the network is difficult. Accordingly, JP-A-2003-178272 discloses an electronic apparatus allowing the mutual authentication by using electromagnetic induction.

However, the electronic apparatus disclosed in JP-A-2003-178272 can be applied to a large electronic apparatus at home but cannot be applied to a mobile electronic apparatus easily. In other words, when a mobile electronic apparatus subject to mutual authentication as described above is carried out in a bag to a public place (such as a crowded train), the mobile electronic apparatus may be authenticated by a malicious third party without permission through the bag, which is a problem. Furthermore, when a mobile electronic apparatus has been authenticated without permission, there is a danger that personal information and/or data stored in the electronic apparatus may be intercepted, which is another problem.

SUMMARY OF THE INVENTION

Accordingly, the invention was made in view of these issues, and it is an object of the invention to allow safe and easy mutual authentication.

According to one aspect of the invention, there is provided a communication system for communicating data between a first information processing apparatus and a second information processing apparatus, wherein the first information processing apparatus judges whether authentication processing is performed for communication between the first information processing apparatus and the second information processing apparatus or not based on a user's operation, when it is determined that the authentication processing is performed and when the second information processing apparatus is arranged within a range of a communicable distance of a first radio communicating portion in the first information processing apparatus, performs the authentication processing by using the first radio communicating portion, registers authentication data, which is obtained from the authentication processing and is required for communication with the second information processing apparatus, with the first information processing apparatus, and communicates data with the second information processing apparatus based on the registered authentication data and by using a second radio communicating portion in the first information processing apparatus, which has a longer communicable distance than that of the first radio communicating portion, and the second information processing apparatus performs authentication processing by using the third radio communicating portion when the first information processing apparatus is arranged within a range of a communicable distance of a third radio communicating portion in the second information processing apparatus, registers authentication data, which is obtained from the authentication processing and is required for communication with the first information processing apparatus, with the second information processing apparatus, and communicates data with the first information processing apparatus based on the registered authentication data and by using a fourth radio communicating portion in the second information processing apparatus, which has a longer communicable distance than that of the third radio communicating portion.

The first information processing apparatus may include an operation input unit to be operated by a user for performing authentication processing and judge whether authentication processing is performed or not based on operation information input through the operation input unit.

The second information processing apparatus may also judge whether authentication processing is performed or not based on a user's operation, and authentication processing may be performed by using a third radio communicating portion when it is judged that the authentication processing is performed and when the first information processing apparatus is arranged within a range of a communicable distance of the third radio communicating portion.

According to another aspect of the invention, there is provided an information processing apparatus including an authentication judging unit judging whether authentication processing is performed for communication with another information processing apparatus or not based on a user's operation, a first radio communicating portion communicating data with the other information processing apparatus, a second radio communicating portion having a longer communicable distance than that of the first radio communicating portion and communicating data with the other information processing apparatus, an authentication performing unit performing authentication processing by using the first radio communicating portion when the authentication judging unit determines performing authentication processing and when the other information processing apparatus is arranged within the range of the communicable distance of the first radio communicating portion, a registering unit registering authentication data, which is obtained as a result of authentication by the authentication performing unit and is required for communication with the other information processing apparatus, and a data communicating unit communicating data with the other information processing apparatus based on the authentication data registered by the registering unit and by using the second radio communicating portion having a longer communicable distance than that of the first radio communicating portion.

The information processing apparatus may further include an operation input unit to be operated by a user for performing authentication processing, wherein the authentication judging unit judges whether authentication processing by the authentication performing unit is performed or not based on operation information input through the operation input unit.

The information processing apparatus may further include an information transmitting unit transmitting call information by using the second radio communicating portion, the call information being used for checking an apparatus existing within the range of the communicable distance of the second radio communicating portion, an information receiving unit receiving response information from the other information processing apparatus by using the second radio communicating portion, the other information processing apparatus having received the call information through the information transmitting unit, and an authenticated apparatus judging unit judging whether the other information processing apparatus is an authenticated apparatus or not based on the response information having been received by the information receiving unit and the authentication data having been registered by the registering unit, wherein the data communication unit communicates data with the other information processing apparatus by using the second radio communicating portion when the authenticated apparatus judging unit judges that the other information processing apparatus is an authenticated apparatus.

The information processing apparatus may further include an information receiving unit receiving call information from the other information processing apparatus by using the second radio communicating portion, the call information being used for checking an apparatus existing within the range of the communicable distance of the other information processing apparatus, an information transmitting unit transmitting response information to the call information, which has been received by the information receiving unit, by using the second radio communicating portion based on the authentication data registered by the registering unit, and a connection permit judging unit judging whether a connection permit signal for response information transmitted by the information transmitting unit has been received from the other information processing apparatus or not, wherein the data communication unit communicates data with the other information processing apparatus by using the second radio communicating portion when the connection permit judging unit judges that a connection permit signal has received from the other information processing apparatus.

According to another aspect of the invention, there is provided an information processing method for a communication system communicating data between an information processing apparatus and another information processing apparatus, the method including an authentication judging step of judging whether authentication processing is performed for communication between the information processing apparatus and the other information processing apparatus or not based on a user's operation, an authentication performing step of performing authentication processing by using a first radio communicating portion in the information processing apparatus when the authentication judging step determines performing authentication processing and when the other information processing apparatus is arranged within the range of the communicable distance of the first radio communicating portion, a registering step of registering authentication data, which is obtained as a result of authentication by the authentication performing step and is required for communication with the other information processing apparatus, and a data communicating step of communicating data with the other information processing apparatus based on the authentication data registered by the registering step and by using a second radio communicating portion being in the information processing apparatus and having a longer communicable distance than that of the first radio communicating portion.

According to another aspect of the invention, there is provided a recording medium recording a program causing a computer to perform information processing in a communication system communicating data between an information processing apparatus and another information processing apparatus, the information processing including an authentication judging step of judging whether authentication processing is performed for communication between the information processing apparatus and the other information processing apparatus or not based on a user's operation, an authentication performing step of performing authentication processing by using a first radio communicating portion in the information processing apparatus when the authentication judging step determines performing authentication processing and when the other information processing apparatus is arranged within the range of the communicable distance of the first radio communicating portion, a registering step of registering authentication data, which is obtained as a result of authentication by the authentication performing step and is required for communication with the other information processing apparatus, and a data communicating step of communicating data with the other information processing apparatus based on the authentication data registered by the registering step and by using a second radio communicating portion being in the information processing apparatus and having a longer communicable distance than that of the first radio communicating portion.

According to another aspect of the invention, there is provided a program causing a computer to perform information processing in a communication system communicating data between an information processing apparatus and another information processing apparatus, the information processing including an authentication judging step of judging whether authentication processing is performed for communication between the information processing apparatus and the other information processing apparatus or not based on a user's operation, an authentication performing step of performing authentication processing by using a first radio communicating portion in the information processing apparatus when the authentication judging step determines performing authentication processing and when the other information processing apparatus is arranged within the range of the communicable distance of the first radio communicating portion, a registering step of registering authentication data, which is obtained as a result of authentication by the authentication performing step and is required for communication with the other information processing apparatus, and a data communicating step of communicating data with the other information processing apparatus based on the authentication data registered by the registering step and by using a second radio communicating portion being in the information processing apparatus and having a longer communicable distance than that of the first radio communicating portion.

The term, "communication, here may refer to radio communication, cable communication or communication including radio communication and cable communication, that is, communication in which radio communication is performed in one section and cable communication is performed in the other section. Furthermore, cable communication may be performed for communication from one apparatus to the other apparatus while radio communication may be performed for communication from the other apparatus to the one apparatus.

According to the invention, mutual authentication can be implemented securely and easily. Furthermore, according to the invention, data communication can be performed securely and easily.

BRIEF DESCRIPTION OF THE DRAWINGS

FIG. 17 is a diagram showing a configuration example of an information processing apparatus of the invention.

DESCRIPTION OF THE PREFERRED EMBODIMENT

Before describing an embodiment of the invention, correspondences between the claimed aspects of the invention and embodiments will be described first. Some embodiments may be described in the specification but may not be written here as ones corresponding to aspects of the invention, but the fact does not mean that the embodiments do not correspond to aspects of the invention. Conversely, some embodiments may be written as ones corresponding to aspects of the invention, but the fact does not mean that the embodiments do not correspond to other aspects of the invention than the aspects of the invention.

Furthermore, the description below does not mean all aspects of the invention described in the specification. In other words, the description below relates to aspects of the invention described in the specification and does not deny the existence of inventions, which are not claimed in this application, that is, the existence of the inventions to be divisionally applied and/or added by amendment.

Figure 1:
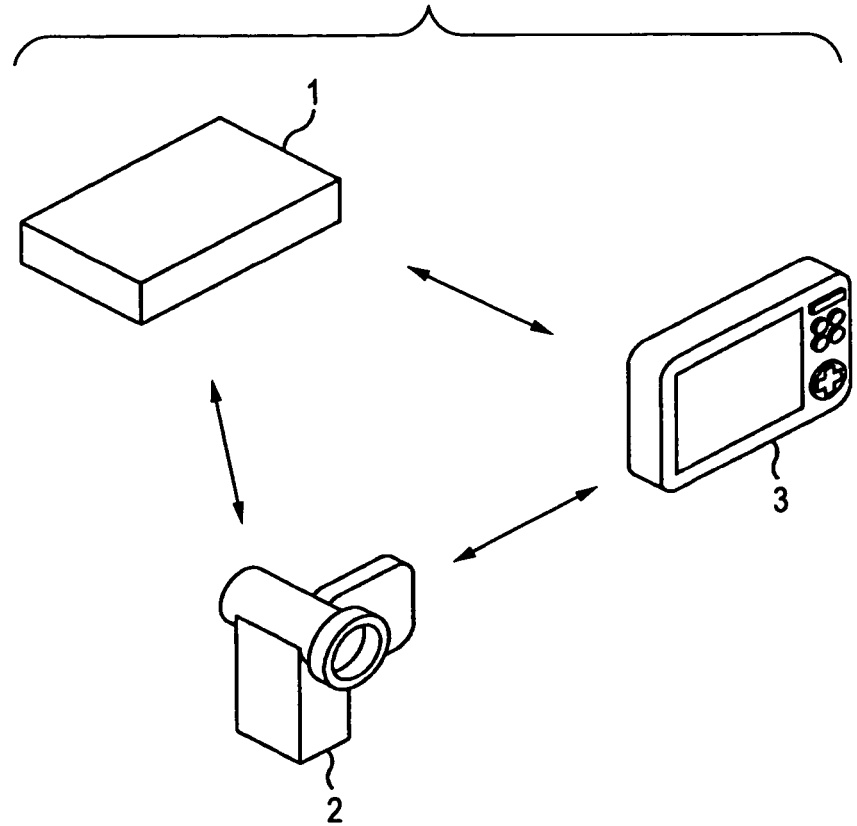
FIG. 1 is a diagram showing a construction example of a radio communication system of the invention.

According to one aspect of the invention, there is provided a communication system for communicating data between a first information processing apparatus (such as a portable server 1 in FIG. 1) and a second information processing apparatus (such as an image pickup apparatus 2 in FIG. 1). In the communication system, the first information processing apparatus (such as the portable server 1 in FIG. 1) judges whether authentication processing is performed for communication between the first information processing apparatus and the second information processing apparatus or not based on a user's operation (such as a step S1 in FIG. 12), when it is determined that the authentication processing is performed and when the second information processing apparatus is arranged within a range (such as the range E1 in FIG. 14) of a communicable distance of a first radio communicating portion in the first information processing apparatus, performs the authentication processing by using the first radio communicating portion (such as an authentication antenna 12 and authentication radio communicating portion 33 in FIG. 3) (such as a step S4 in FIG. 12), registers authentication data, which is obtained from the authentication processing and is required for communication with the second information processing apparatus, with the first information processing apparatus (such as a step S5 in FIG. 12), and communicates data with the second information processing apparatus based on the registered authentication data and by using a second radio communicating portion (such as an antenna 35 and radio communicating portion 34 in FIG. 3) in the first information processing apparatus, which has a longer communicable distance than that of the first radio communicating portion (such as a step S48 in FIG. 15), and the second information processing apparatus (such as the image pickup apparatus 2 in FIG. 1) performs authentication processing by using the third radio communicating portion when the first information processing apparatus is arranged within a range (such as the range E2 in FIG. 14) of a communicable distance of a third radio communicating portion (such as an authentication antenna 102 and authentication radio communicating portion 144 in FIG. 8) in the second information processing apparatus (such as a step S24 in FIG. 12), registers authentication data, which is obtained from the authentication processing and is required for communication with the first information processing apparatus, with the second information processing apparatus (such as a step S25 in FIG. 12), and communicates data with the first information processing apparatus based on the registered authentication data and by using a fourth radio communicating portion (such as an antenna 146 and radio communicating portion 145 in FIG. 8) in the second information processing apparatus, which has a longer communicable distance than that of the third radio communicating portion (such as a step S66 in FIG. 15).

The first information processing apparatus may include an operation input unit (such as an authentication button 41 in FIG. 3) to be operated by a user for performing authentication processing and judge whether authentication processing is performed or not based on operation information input through the operation input unit.

The second information processing apparatus may also judge whether authentication processing is performed or not based on a user's operation (such as a step S21 in FIG. 12), and authentication processing may be performed by using a third radio communicating portion when it is judged that the authentication processing is performed and when the first information processing apparatus is arranged within a range (such as the range E2 in FIG. 14) of a communicable distance of the third radio communicating portion.

According to another aspect of the invention, there is provided an information processing apparatus (such as the portable server 1 in FIG. 1) including an authentication judging unit (such as an authentication control portion 61 in FIG. 4) judging whether authentication processing is performed for communication with another information processing apparatus (such as the image pickup apparatus 2 in FIG. 1) or not based on a user's operation, an authentication performing unit (such as an authentication data communicating portion 63 in FIG. 4) performing authentication processing by using a first radio communicating portion (such as the authentication antenna 12 in FIG. 3) when the authentication judging unit determines performing authentication processing and when the other information processing apparatus is arranged within the range (such as the range E1 in FIG. 14) of the communicable distance of the first radio communicating portion, a registering unit (such as an authentication data registering portion 64 in FIG. 4) registering authentication data, which is obtained as a result of authentication by the authentication performing unit and is required for communication with the other information processing apparatus, and a data communicating unit (such as a data communicating portion 84 in FIG. 5) communicating data with the other information processing apparatus based on the authentication data registered by the registering unit and by using the second radio communicating portion (such as the antenna 35 in FIG. 3) having a longer communicable distance than that of the first radio communicating portion.

The information processing apparatus may further include an operation input unit (such as the authentication button 41 in FIG. 3) to be operated by a user for performing authentication processing, wherein the authentication judging unit judges whether authentication processing by the authentication performing unit is performed or not based on operation information input through the operation input unit.

The information processing apparatus may further include an information transmitting unit (such as an information transmitting portion 91 in FIG. 5 performing processing at a step S41 in FIG. 15) transmitting call information by using the second radio communicating portion (such as the antenna 35 in FIG. 3), the call information being used for checking an apparatus existing within the range of the communicable distance of the second radio communicating portion, an information receiving unit (such as an information receiving portion 92 in FIG. 5 performing processing at a step S42 in FIG. 15) receiving response information from the other information processing apparatus by using the second radio communicating portion, the other information processing apparatus having received the call information through the information transmitting unit, and an authenticated apparatus judging unit (such as a communication control portion 81 in FIG. 5 performing processing at a step S44 in FIG. 15) judging whether the other information processing apparatus is an authenticated apparatus or not based on the response information having been received by the information receiving unit and the authentication data having been registered by the registering unit, wherein the data communication unit communicates data with the other information processing apparatus by using the second radio communicating portion when the authenticated apparatus judging unit judges that the other information processing apparatus is an authenticated apparatus.

The information processing apparatus may further include an information receiving unit (such as the information receiving portion 92 in FIG. 5 performing processing at a step S61 in FIG. 15) receiving call information from the other information processing apparatus by using the second radio communicating portion (such as the antenna 35 in FIG. 3), the call information being used for checking an apparatus existing within the range of the communicable distance of the other information processing apparatus, an information transmitting unit (such as the information transmitting portion 91 in FIG. 5 performing processing at a step S62 in FIG. 15) transmitting response information to the call information, which has been received by the information receiving unit, by using the second radio communicating portion based on the authentication data registered by the registering unit, and a connection permit judging unit (such as the communication control portion 81 in FIG. 5 performing processing at a step S63 in FIG. 15) judging whether a connection permit signal for response information transmitted by the information transmitting unit has been received from the other information processing apparatus or not, wherein the data communication unit communicates data with the other information processing apparatus by using the second radio communicating portion when the connection permit judging unit judges that a connection permit signal has received from the other information processing apparatus.

Figure 3:
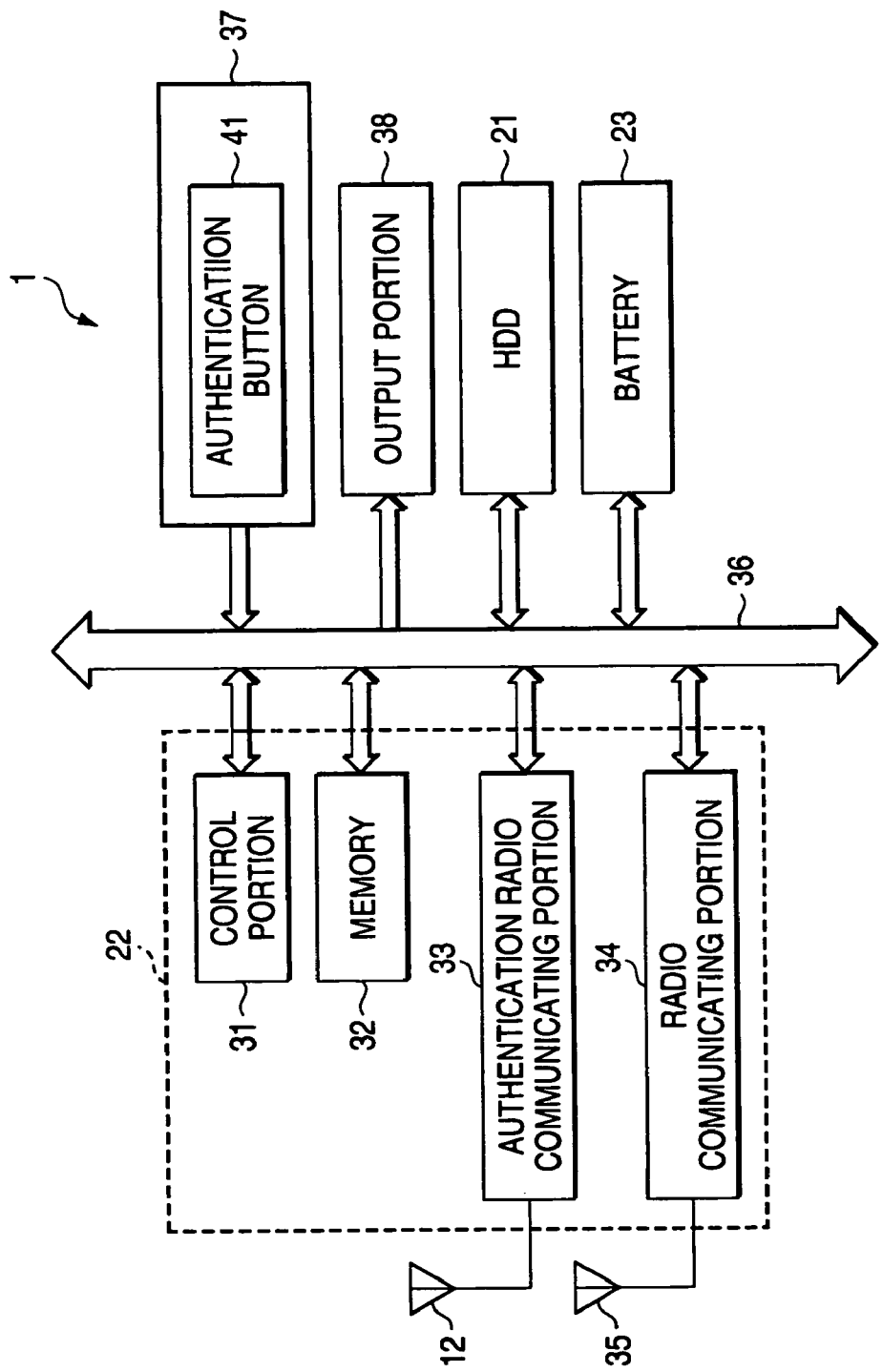
FIG. 3 is a block diagram showing an internal configuration example of the portable server in FIG. 1.

According to another aspect of the invention, there is provided an information processing method including an authentication judging step (such as the step S1 in FIG. 12) of judging whether authentication processing is performed for communication between the information processing apparatus and the other information processing apparatus or not based on a user's operation, an authentication performing step (such as the step S4 in FIG. 12) of performing authentication processing by using a first radio communicating portion (such as the authentication antenna 12 and authentication radio communicating portion 33 in FIG. 3) in the information processing apparatus when the authentication judging step determines performing authentication processing and when the other information processing apparatus (such as the image pickup apparatus 2 in FIG. 1) is arranged within the range (such as the range E1 in FIG. 14) of the communicable distance of the first radio communicating portion, a registering step (such as the step S5 in FIG. 12) of registering authentication data, which is obtained as a result of authentication by the authentication performing step and is required for communication with the other information processing apparatus, and a data communicating step (such as the step S48 in FIG. 15) of communicating data with the other information processing apparatus based on the authentication data registered by the registering step and by using a second radio communicating portion (such as the antenna 35 and radio communicating portion 34 in FIG. 3) being in the information processing apparatus and having a longer communicable distance than that of the first radio communicating portion.

Since a recording medium and program of the invention basically have the same construction as that of the information processing method of the invention, the repetitive description will be omitted herein.

Embodiments of the invention will be described below with reference to drawings.

FIG. 1 shows a construction example of a radio communication system according to the invention. In FIG. 1, a portable server 1, an image pickup apparatus 2 and a portable viewer 3 are portable apparatus and are connected to each other by radio.

The portable server 1 is an information processing apparatus, which is a portable and wireless home server centrally managing video data at user's home, for example, and has a main storage function for the image pickup apparatus 2 and portable viewer 3. In other words, the portable server 1 stores video data from the image pickup apparatus 2 and/or loads the stored video data to the portable viewer 3. In reality, voice data is processed similarly, the processing of voice data is omitted in the example in FIG. 1.

The image pickup apparatus 2 includes a camcorder. The image pickup apparatus 2 shoots a subject in accordance with a manipulation by a user and encodes the shot and input video data (moving image data and/or still image data) to MPEG (Moving Picture Experts Group)2, for example, and sends the encoded video data to the portable server 1. In other words, the portable server 1 and the image pickup apparatus 2 are physically separated shooting and storage units of one camcorder. The shooting unit and storage unit are connected by radio. The portable viewer 3 is a portable display apparatus. The portable viewer 3 reconstructs video data stored in the portable server 1 and displays the reconstructed images on a self-contained display.

In the radio communication system, the portable server 1, the image pickup apparatus 2 and the portable viewer 3 are connected by radio. In order to deny accesses by third parties thereto from the point of view of security control and copyright protection, each of the portable server 1, the image pickup apparatus 2 and the portable viewer 3 has two communicating portions of a radio communicating portion and an authentication radio communicating portion.

The radio communicating portion is used for general data communication (that is, non-authentication communication) between apparatus, and the receivable distance (or communicable distance) is a distance from an antenna of the radio communicating portion, such as several meter (m) to several tens of meter (m). The transmission speed is a Mbps or higher. More specifically, the radio communicating portion includes IEEE 802.11b or 11g, which is the radio LAN (Local Area Network) standard or a UWB (Ultra Wide Band). The authentication radio communicating portion can be used for authentication processing to be performed for connecting to another apparatus for the first time. The receivable distance (or communicable distance) is extremely shorter than the receivable distance of the radio communicating portion and is a distance from an antenna of the authentication radio communicating portion from several mm to several cm. More specifically, the authentication radio communicating portion can perform radio communication like the one used for a non-contact IC card.

Each of the portable server 1, the image pickup apparatus 2 and the portable viewer 3 has an authentication antenna and an authentication button. In this case, the authentication antenna is to be used by the authentication radio communicating portion, and the authentication button is to be used by a user for commanding each of the apparatus to perform authentication processing. For example, when a user needs to cause the portable server 1 and the image pickup apparatus 2 to authenticate each other, the user may press the authentication buttons of the portable server 1 and image pickup apparatus 2, and the portable server 1 and the image pickup apparatus 2 are brought close to each other to the receivable distances of the respective authentication antennas (authentication radio communicating portions). Thus, the respective authentication radio communicating portions implement authentication processing in the portable server 1 and the image pickup apparatus 2, and mutual authentication can be implemented between the portable server 1 and the image pickup apparatus 2.

The above-described processing is implemented between the portable server 1 and the portable viewer 3 and between the image pickup apparatus 2 and the portable viewer 3 so that mutual authentication can be implemented among the apparatus in the radio communication system. Thus, data communication among the apparatus can be performed thereafter by the radio communicating portions in the portable server 1, the image pickup apparatus 2 and the portable viewer 3.

Figure 2:
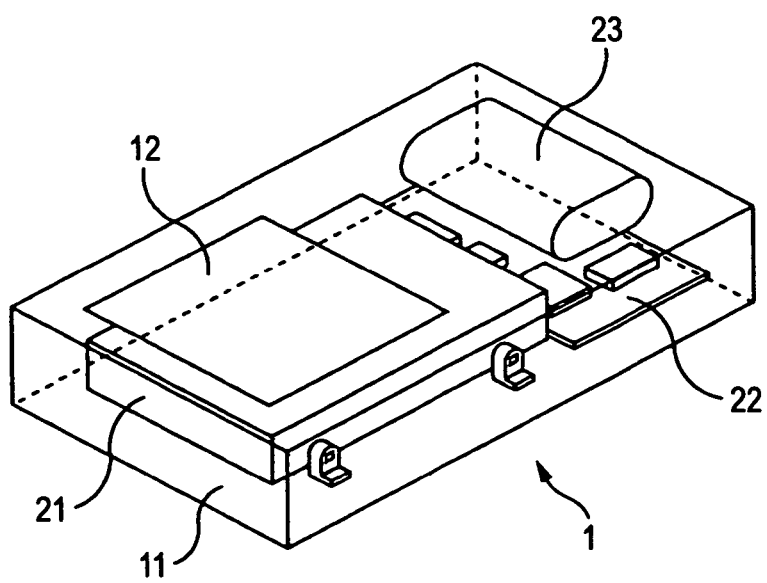
FIG. 2 is a perspective diagram showing an external construction example of a portable server in FIG. 1.

FIG. 2 shows a construction example of an appearance of the portable server 1 in FIG. 1. In FIG. 2, a cabinet 11 of the portable server 1 is transparently shown to show a part of the internal components in the cabinet 11.

An authentication antenna 12 is provided on the upper surface of the cabinet 11 of the portable server 1. The authentication antenna 12 can be used for authenticating other apparatus. While, in the example in FIG. 2, the authentication antenna 12 is provided on the upper surface of the cabinet 11, the authentication antenna 12 only needs to be provided near the surface of the cabinet 11 so as to be brought closer to or contact with an authentication antenna of the other apparatus during authentication processing. Therefore, the authentication antenna 12 may be provided on the back of the upper surface. An antenna 35 (not shown in FIG. 2 but shown in FIG. 3) is provided in the portable server 1. The antenna 35 can be used for general communication during non-authentication processing.

In the cabinet 11, a hard disk drive 21 and a circuit portion 22 are provided on the lower surface of the cabinet 11. The hard disk drive 21 includes a high-speed and large capacity random access memory. The circuit portion 22 includes an authentication radio communicating portion 33 and a radio communicating portion 34 (which will be described later with reference to FIG. 3). Furthermore, a battery 23 is provided above the circuit portion 22. The battery 23 supplies power to the components of the portable server 1.

FIG. 3 shows an internal configuration example of the portable server 1. In FIG. 3, the same reference numerals are given to the same components as those in FIG. 2, the repetitive description of which will be omitted herein. In the example in FIG. 3, the circuit portion 22 includes a control portion 31, a memory 32, an authentication radio communicating portion 33 and a radio communicating portion 34.

The control portion 31 controls the components of the portable server 1 based on a command signal from an operation input portion 37 to be operated by a user or a control signal from another apparatus to be received through the radio communicating portion 34. The memory 32 includes a non-volatile memory. The authentication radio communicating portion 33 registers authentication data of another apparatus (such as the image pickup apparatus 2) with the memory 32. The authentication data includes data required for authentication and data communication after authentication, such as product IDs (Identifiers) and encryption key data. The authentication radio communicating portion 33 implements authentication processing for another apparatus by radio communicable from several mm to several cm through the authentication antenna 12 and registers authentication data required for data communication with the other apparatus, which has been obtained from authentication, with the memory 32. The radio communicating portion 34 communicates video data with the other apparatus authenticated by the authentication radio communicating portion 33 by radio communicable from several m to several tens of m through the antenna 35 based on the authentication data registered with the memory 32.

The control portion 31, memory 32, authentication radio communicating portion 33 and radio communicating portion 34 are connected to each other through a bus 36. The operation input portion 37, an output portion 38, the hard disk drive (HDD) 21 and the battery 23 are also connected to the bus 36.

The operation input portion 37 includes different kinds of button and switch. The buttons also include an authentication button 41, which prevents authentication in the portable server 1 unless a user intentionally operates the authentication button 41. While the authentication button 41 may be turned on by one operation by a user, the authentication button 41 can be turned on by two operations by a user so as to improve the security for authentication. For example, the authentication button 41 may include a lockable rotational switch such as a record switch of a camcorder. In this case, the authentication button 41 is not turned on unless the switch is unlocked by the first operation and is rotated by the second operation. Alternatively, the authentication button 41 may include a cover switch, which is uncovered by the first operation and is turned on by the second operation. The output portion 38 includes an indicator or indicators for indicating an authentication state or connection state of another apparatus.

Figure 4:
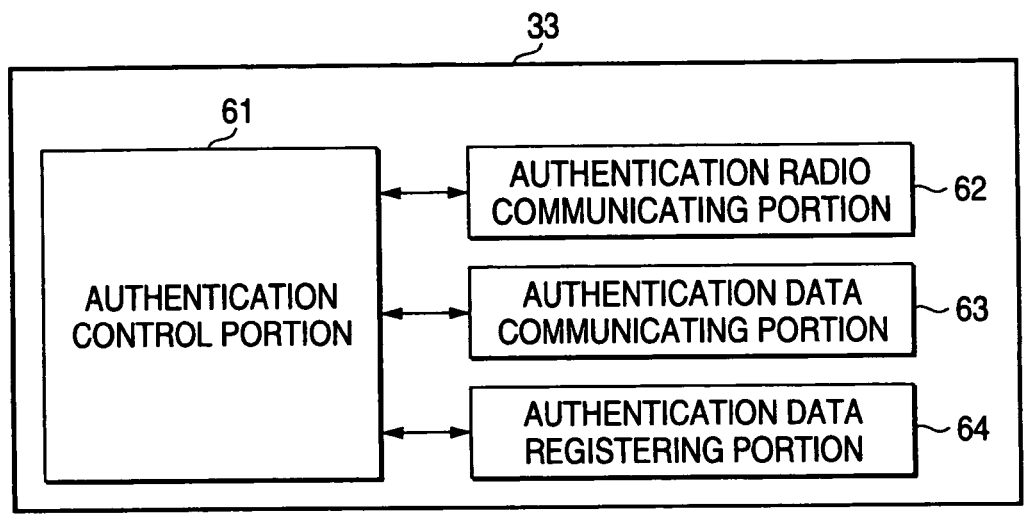
FIG. 4 is a block diagram showing a detail configuration example of an authentication radio communicating portion in FIG. 3.

FIG. 4 shows a detail configuration example of the authentication radio communicating portion 33. In the example in FIG. 4, the authentication radio communicating portion 33 includes an authentication control portion 61, an authentication radio communicating portion 62, an authentication data communicating portion 63 and an authentication data registering portion 64.

The authentication control portion 61 controls the authentication radio communicating portion 62 and the authentication data communicating portion 63 based on an operation by a user on the authentication button 41 to implement authentication processing. In other words, the authentication control portion 61 controls the authentication radio communicating portion 62 based on an operation by a user on the authentication button 41 to implement exchanges of radio communicable from several mm to several cm through the authentication antenna 12. The authentication control portion 61 further monitors the authentication radio communicating portion 62. Thus, when the authentication control portion 61 receives radio from another apparatus through the authentication radio communicating portion 62, the authentication control portion 61 controls the authentication data communicating portion 63 to implement authentication processing with the other apparatus from which radio has been received. After the authentication processing is implemented, the authentication control portion 61 controls the authentication data registering portion 64 to register authentication data resulting from the authentication processing with the memory 32 or to cause the indicator of the output portion 38 to indicate an authentication state or connection state, in the portable server 1, of the other apparatus.

The authentication radio communicating portion 62 sends authentication radio for authentication communicable from several mm to several cm to another apparatus through the authentication antenna 12 and/or receives response radio corresponding to authentication radio from another apparatus through the authentication antenna 12. The authentication data communicating portion 63 exchanges authentication data (such as a product ID (or Identifier) and an encryption key) required for authentication or data communication after authentication with another apparatus by radio communicable from several mm to several cm through the authentication antenna 12 and outputs the received authentication data to the authentication control portion 61. The authentication data registering portion 64 registers authentication data from the authentication control portion 61 with the memory 32.

Figure 5:
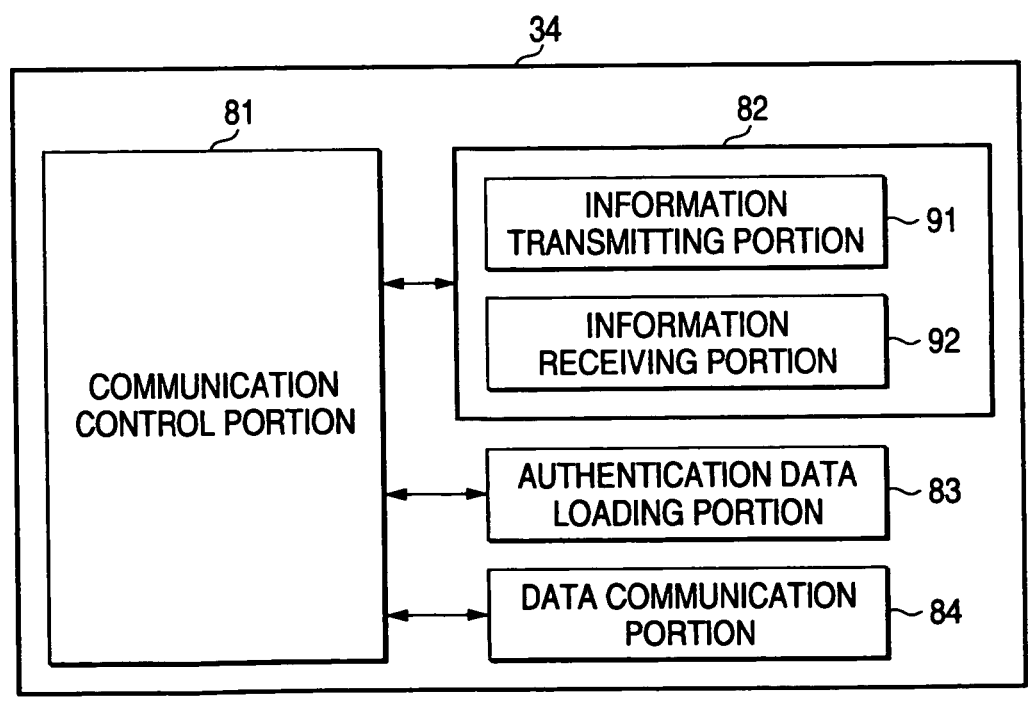
FIG. 5 is a block diagram showing a detail configuration example of the radio communicating portion in FIG. 3.

FIG. 5 shows a detail configuration example of the radio communicating portion 34. In the example in FIG. 5, the radio communicating portion 34 includes a communication control portion 81, a connection processing portion 82, an authentication data loading portion 83 and a data communicating portion 84.

The communication control portion 81 controls the connection processing portion 82 at predetermined intervals to send a call radio communicable from several m to several tens of m for checking the existence of another apparatus. When the connection processing portion 82 receives response radio from the other apparatus to the call radio, the communication control portion 81 controls the connection processing portion 82 and the authentication data loading portion 83 to load authentication data and implement processing of connecting to the other apparatus having sent the call radio by radio communicable from several m to several tens of m based on the loaded authentication data. After the connection processing is implemented, the communication control portion 81 causes the indicator of the output portion 38 to indicate a state of connection with another apparatus and/or controls the data communicating portion 84 to implement processing of data communication with the other apparatus having undergone the connection processing by radio communicable from several m to several tens of m.

The connection processing portion 82 includes an information transmitting portion 91 and an information receiving portion 92. The information transmitting portion 91 sends call radio communicable from several m to several tens m or response radio to call radio from another apparatus through the antenna 35. The information transmitting portion 91 transmits a connection permit signal or a check signal to a connection permit signal from another apparatus by radio communicable from several m to several tens of m through the antenna 35. The information receiving portion 92 receives call radio from another apparatus or response radio to call radio by radio communicable from several m to several tens of m through the antenna 35. The information receiving portion 92 further receives a check signal to a connection permit signal or a connection permit signal by radio communicable from several m to several tens of m through the antenna 35.

The authentication data loading portion 83 loads authentication data corresponding to a response signal received from the memory 32 and supplies the loaded authentication data to the communication control portion 81. The data communicating portion 84 performs data communication with another connection-permitted apparatus by radio communicable from several m to several tens of m under the control of the communication control portion 81.

Figure 6:
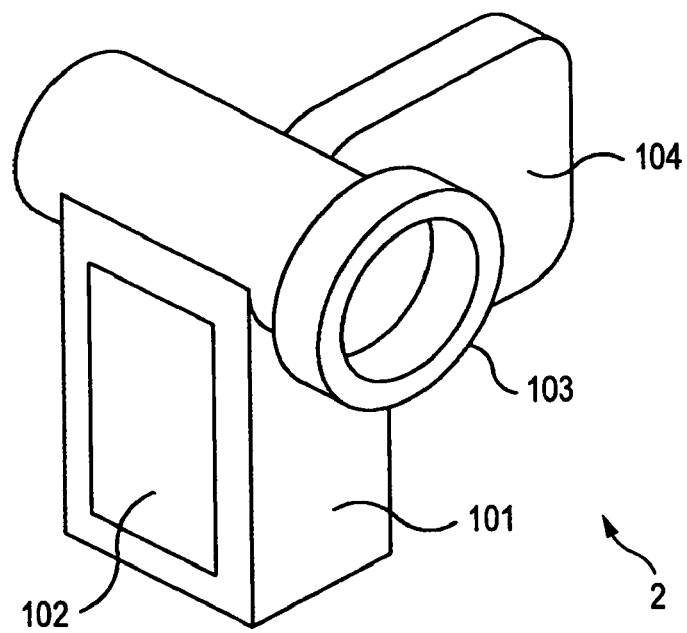
FIG. 6 is a perspective diagram showing an external construction example of an image pickup apparatus in FIG. 1.

FIG. 6 shows a construction example of an appearance of the image pickup apparatus 2 in FIG. 1. In the example in FIG. 6, the image pickup apparatus 2 includes a cabinet 101, an authentication antenna 102, a camera portion 103 and a display portion 104.

The authentication antenna 102 has the same construction as that of the authentication antenna 12 in FIG. 2 and is provided on a side of the cabinet 101. While, in the example in FIG. 6, the authentication antenna 102 is provided on the external side of the cabinet 101, the authentication antenna 102 only needs to be provided near a surface of the cabinet 101 so as to be brought close to or contact with the authentication antenna 12 of the portable server 1, for example, for authentication. The authentication antenna 102 may be provided on an internal side of the cabinet 101.

The camera portion 103 includes a lens and a CCD (Charge-Coupled Device) image pickup device for imaging a subject and is provided in the upper part of the cabinet 101 on this side in FIG. 6. The display portion 104 is closeably connected to the cabinet 101 through a hinge, not shown, such that the display portion 104 can be opened toward the opposite side of the authentication antenna 102 of the cabinet 101 in shooting and can be folded and closed along the cabinet 101 when stored.

Figure 7:
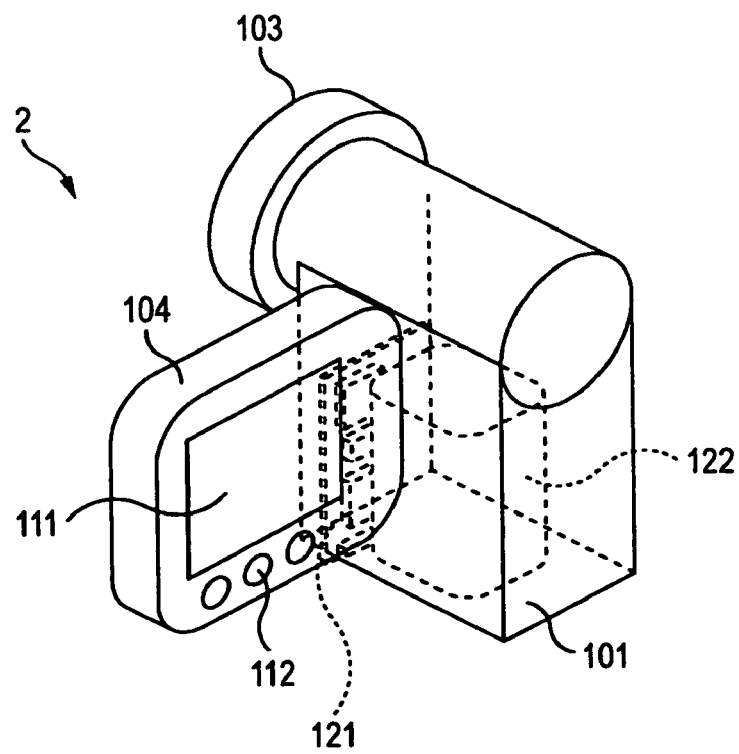
FIG. 7 is a perspective diagram showing the external construction example of the image pickup apparatus in FIG. 6 from the opposite direction.

FIG. 7 shows a construction example of the appearance of the image pickup apparatus 2 in FIG. 6 from the opposite direction. In FIG. 7, the dashed lines indicate a part of the internal components of the cabinet 101 of the image pickup apparatus 2.

In the example in FIG. 7, the display portion 104 includes a display 111 for displaying images being shot, an authentication state and/or connection state with another apparatus or status information (that is, record status, standby status or play status) of the portable server 1. The display portion 104 further includes control buttons 112 at the bottom of the display 111. The control buttons 112 are to be used by a user for commanding predetermined processing to be performed by the image pickup apparatus 2.

A circuit portion 121 is provided on the surface near the camera portion 103 in the cabinet 101. The circuit portion 121 includes a control portion 141, an authentication radio communicating portion 144 and a radio communicating portion 145 (which will be described later with reference to FIG. 8). A battery 122 is provided at the internal center of the cabinet 101. The battery 122 supplies power to components of the image pickup apparatus 2.

Figure 8:
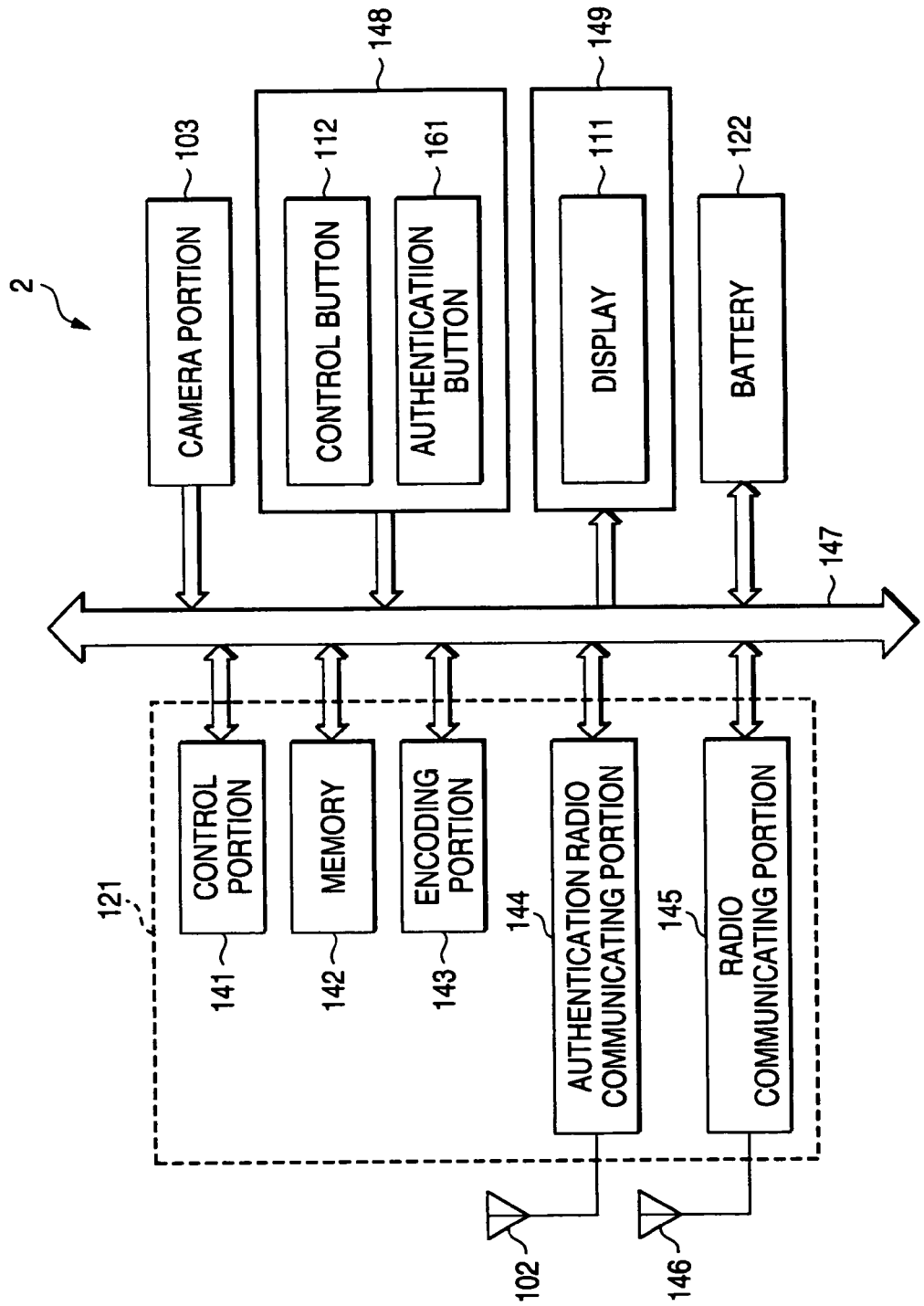
FIG. 8 is a block diagram showing an internal configuration example of the image pickup apparatus in FIG. 1.

FIG. 8 shows an internal configuration example of the image pickup apparatus 2. In FIG. 8, the same reference numerals are given to the same components as those of FIG. 7, the repetitive description of which will be omitted herein. In the example in FIG. 8, the circuit portion 121 includes a control portion 141, a memory 142, an encoding portion 143, an authentication radio communicating portion 144 and a radio communicating portion 145.

The control portion 141 controls components of the image pickup apparatus 2 based on a command signal from the operation input portion 148 in response to an operation by a user. The control portion 141 controls components of the portable server 1 through the radio communication portion 145 and the antenna 146. The memory 142 includes a non-volatile memory. The authentication radio communicating portion 144 registers authentication data required for data communication with other apparatus (such as the portable server 1) with the memory 142. The encoding portion 143 performs encoding processing such as MPEG2 on video data input from the camera portion 103 and outputs the encoded video data to the hard disk drive 21 of the portable server 1 through the radio communicating portion 145 and the antenna 146.

The authentication radio communicating portion 144 performs authentication processing for other apparatus (such as the portable server 1) through the authentication antenna 102 and registers the authentication data resulting from the authentication and required for data communication with other apparatus with the memory 142. The radio communicating portion 145 implements processing of communicating video data and/or control data with another apparatus authenticated by the authentication radio communicating portion 144 through the antenna 146 based on authentication data registered with the memory 142. The authentication radio communicating portion 144 and the radio communicating portion 145 have basically the same constructions as that of the authentication radio communicating portion 33, which was described above with reference to FIG. 4, and as that of the radio communicating portion 34, which was described with reference to FIG. 5. Therefore, in the description below, the constructions of the authentication radio communicating portion 33 in FIG. 4 and radio communicating portion 34 in FIG. 5 can be applied as the constructions of the authentication radio communicating portion 144 and radio communicating portion 145 as required.

The control portion 141, the memory 142, the encoding portion 143, the authentication radio communicating portion 144 and the radio communicating portion 145 are connected to each other through a bus 147. The bus 147 is also connected to the camera portion 103, the operation input portion 148, the output portion 149 and the battery 122.

The camera portion 103 images a subject and outputs imaged video data to the encoding portion 143. The operation input portion 148 includes different kinds of button and switch. The different kinds of button includes a control button 112, and an authentication button 161. The control button 112 is to be used by a user for commanding predetermined processing by the image pickup apparatus 2. The authentication button 161 prevents authentication in the image pickup apparatus 2 unless a user intentionally operates the authentication button 161. The authentication button 161 has basically the same construction as that of the authentication button 41 in FIG. 3, the repetitive detail description of which will be omitted herein. The output portion 149 includes a display 111 and a speaker. The display 111 may include a cathode ray tube (CRT) or a liquid crystal display (LCD).

Figure 9:
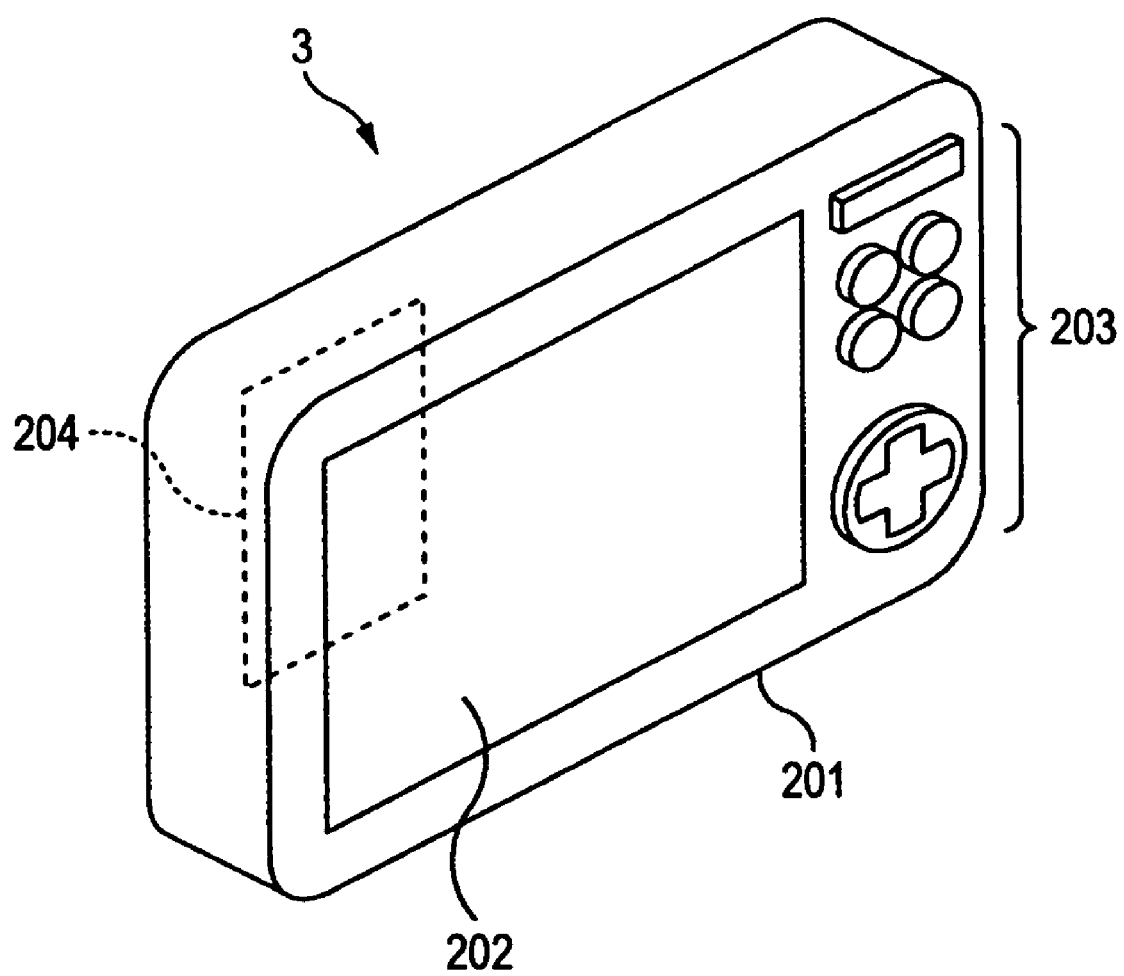
FIG. 9 is a perspective diagram showing an external construction example of a portable viewer in FIG. 1.

FIG. 9 shows a construction example of an appearance of the portable viewer 3 in FIG. 1. In the example in FIG. 9, the portable viewer 3 includes a cabinet 201, a display 202, control buttons 203 and an authentication antenna 204.

The display 202 is provided on the front surface of the cabinet 201. The display 202 displays a restructured image and an authentication status and/or connection status with another apparatus or status information of the portable viewer 3 and/or portable server 1. The control buttons 203 are provided on the side of the display 202. The control buttons 203 are to be used by a user for commanding predetermined processing by the portable viewer 3.

The authentication antenna 204 has the same construction as that of the authentication antenna 12 in FIG. 2. As indicated by the dashed lines, the authentication antenna 204 is provided on the back (the other surface without the display 202) of the cabinet 201. While, in the example in FIG. 9, the authentication antenna 204 is provided on the external side of the back of the cabinet 201, the authentication antenna 204 only needs to be provided near a surface of the cabinet 201 so as to be brought close to or contact with an authentication antenna of another apparatus during authentication processing. Therefore, the authentication antenna 204 may be provided on the internal side of the back of the cabinet 201.

Figure 10:
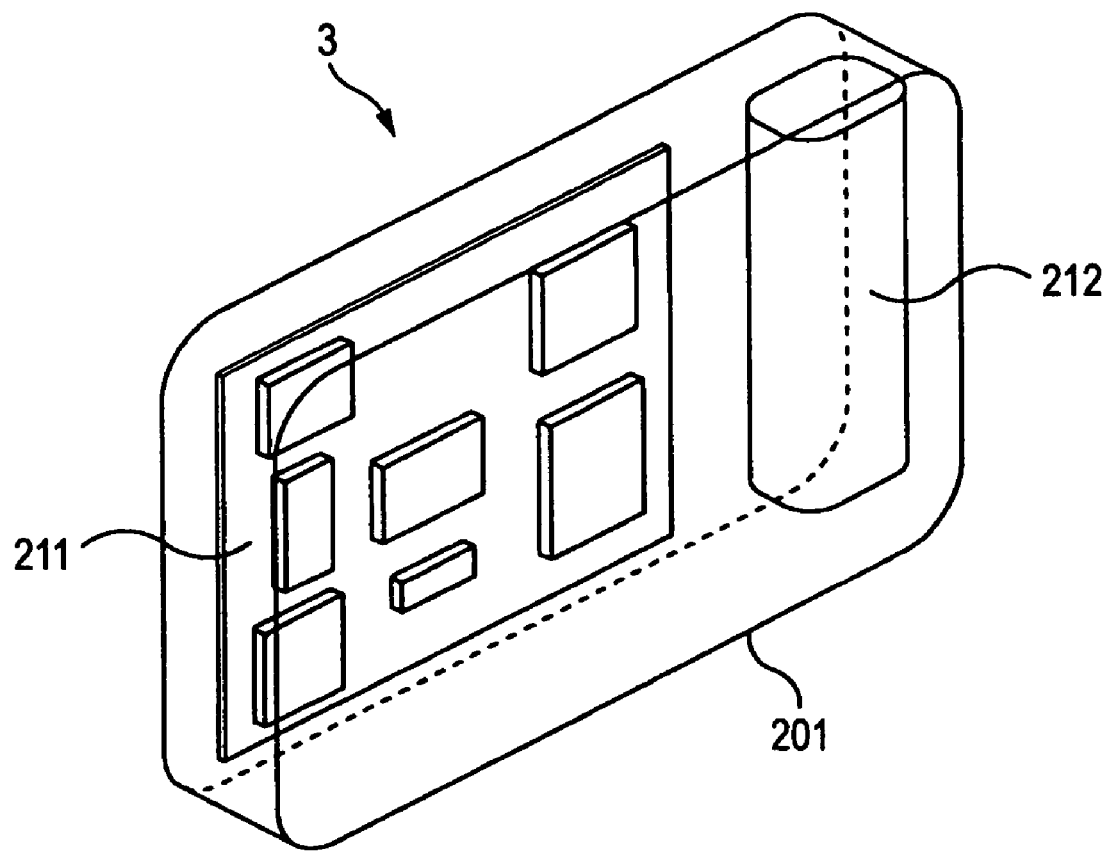
FIG. 10 is a see-through perspective diagram showing a construction example of the portable viewer in FIG. 9.

FIG. 10 is a part of an internal construction example through the portable viewer 3 transparently shown in FIG. 9.

In the example in FIG. 10, a circuit portion 211 is provided on the internal back (that is, the surface having the authentication antenna 204) of the cabinet 201. The circuit portion 211 includes a control portion 231, an authentication radio communicating portion 234 and a radio communicating portion 235 (which will be described later with reference to FIG. 11). A battery 212 is provided on the right side in FIG. 10. The battery 212 supplies power to components of the portable viewer 3.

Figure 11:
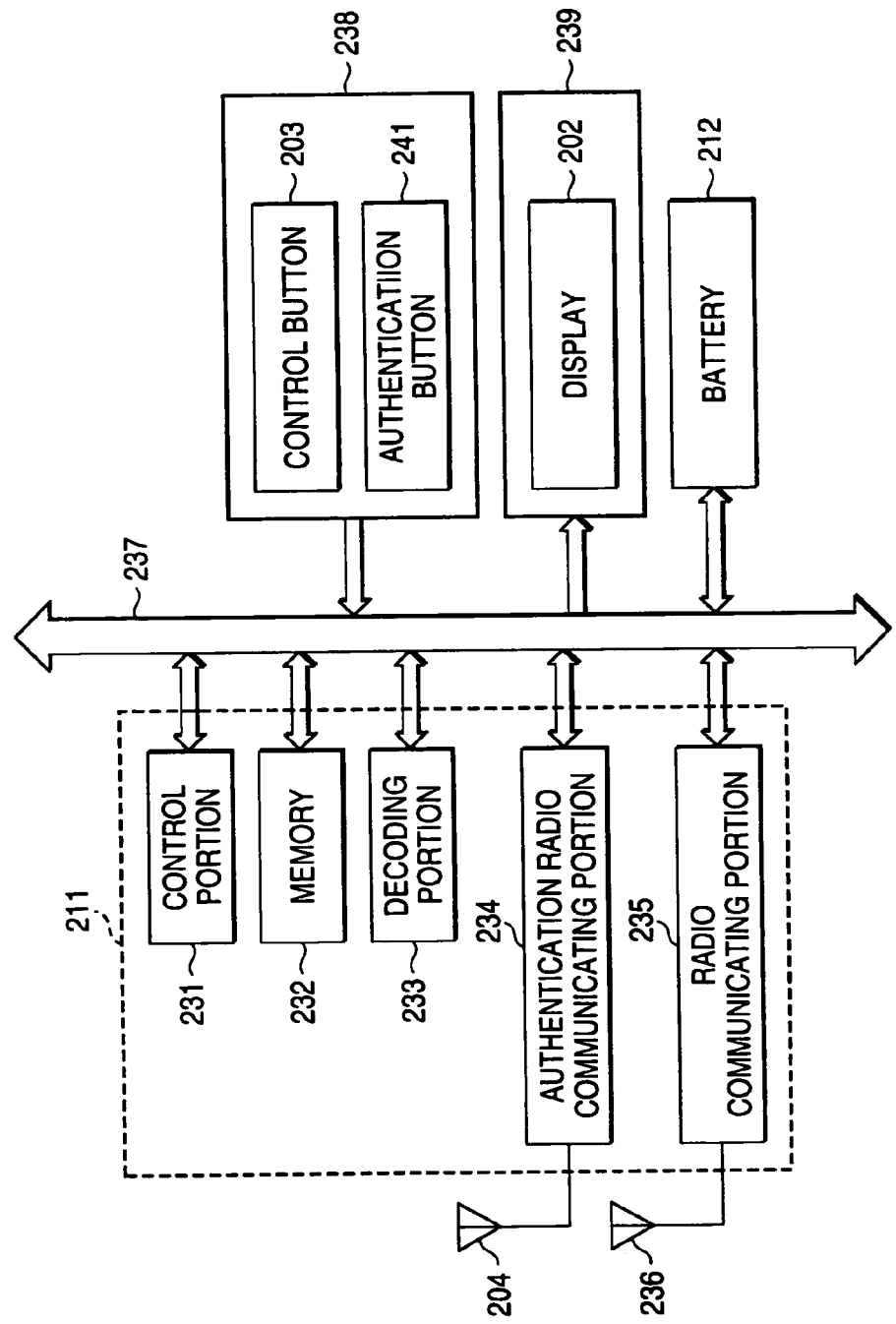
FIG. 11 is a block diagram showing an internal configuration example of the portable viewer in FIG. 1.

FIG. 11 shows an internal configuration example of the portable viewer 3. In FIG. 11, the same reference numerals are given to the same components as those in FIGS. 9 and 10, the repetitive description of which will be omitted herein. In the example in FIG. 11, the circuit portion 211 includes a control portion 231, a memory 232, a decoding portion 233, an authentication radio communicating portion 234 and a radio communicating portion 235.

The control portion 231 controls components of the portable viewer 3 based on command signals from the operation input portion 238 in response to operations by a user thereon. The control portion 231 controls components of the portable server 1 through the radio communicating portion 235 and the antenna 236 based on command signals from the operation input portion 238. For example, the control portion 231 controls components of the portable server 1 for adjustable-speed reconstruction in order to reconstruct video data stored in the portable server 1 at adjustable speeds. The memory 232 includes a non-volatile memory. The authentication radio communicating portion 234 registers authentication data required for data communication with other apparatus (such as the portable server 1) with the memory 232. The decoding portion 233 decodes video data loaded from the portable server 1 through the radio communicating portion 235 and the antenna 236 and causes the decoded video data to be displayed on the display 202.

The authentication radio communicating portion 234 performs authentication processing for another apparatus through the authentication antenna 204 and registers the authentication data resulting from the authentication processing and required for data communication with the other apparatus with the memory 232. The radio communicating portion 235 performs communication processing of video data or control data with the other apparatus authenticated by the authentication radio communicating portion 234 through the antenna 236 based on authentication data registered with the memory 232. The authentication radio communicating portion 234 and the radio communicating portion 235 have basically the same construction as that of the authentication radio communicating portion 33, which has been described with reference to FIG. 4, and the radio communicating portion 34, which has been described with reference to FIG. 5. Therefore, in the description below, the construction of the authentication radio communicating portion 33 in FIG. 4 and the radio communicating portion 34 in FIG. 5 is applied as the construction of the authentication radio communicating portion 234 and radio communicating portion 235 as required.

In the example in FIG. 11, the control portion 231, memory 232, decoding portion 233, authentication radio communicating portion 234 and radio communicating portion 235 are connected to each other through a bus 237. The bus 237 is also connected to an operation input portion 238, an output portion 239 and a battery 212.

The operation input portion 238 includes different kinds of button and switch. The different kinds of button include a control button 203 and an authentication button 241. The control button 203 is to be used by a user for commanding predetermined processing on the portable viewer 3. The authentication button 241 is to be used by a user for preventing authentication unless a user intentionally operates the authentication button 241. The authentication button 241 has basically the same construction as that of the authentication button 41 in FIG. 3, the repetitive description of which will be omitted herein. The output portion 239 includes a display 202 having a Cathode Ray Tube (CRT) or a Liquid Crystal Display (LCD) and a speaker.

Figure 12:
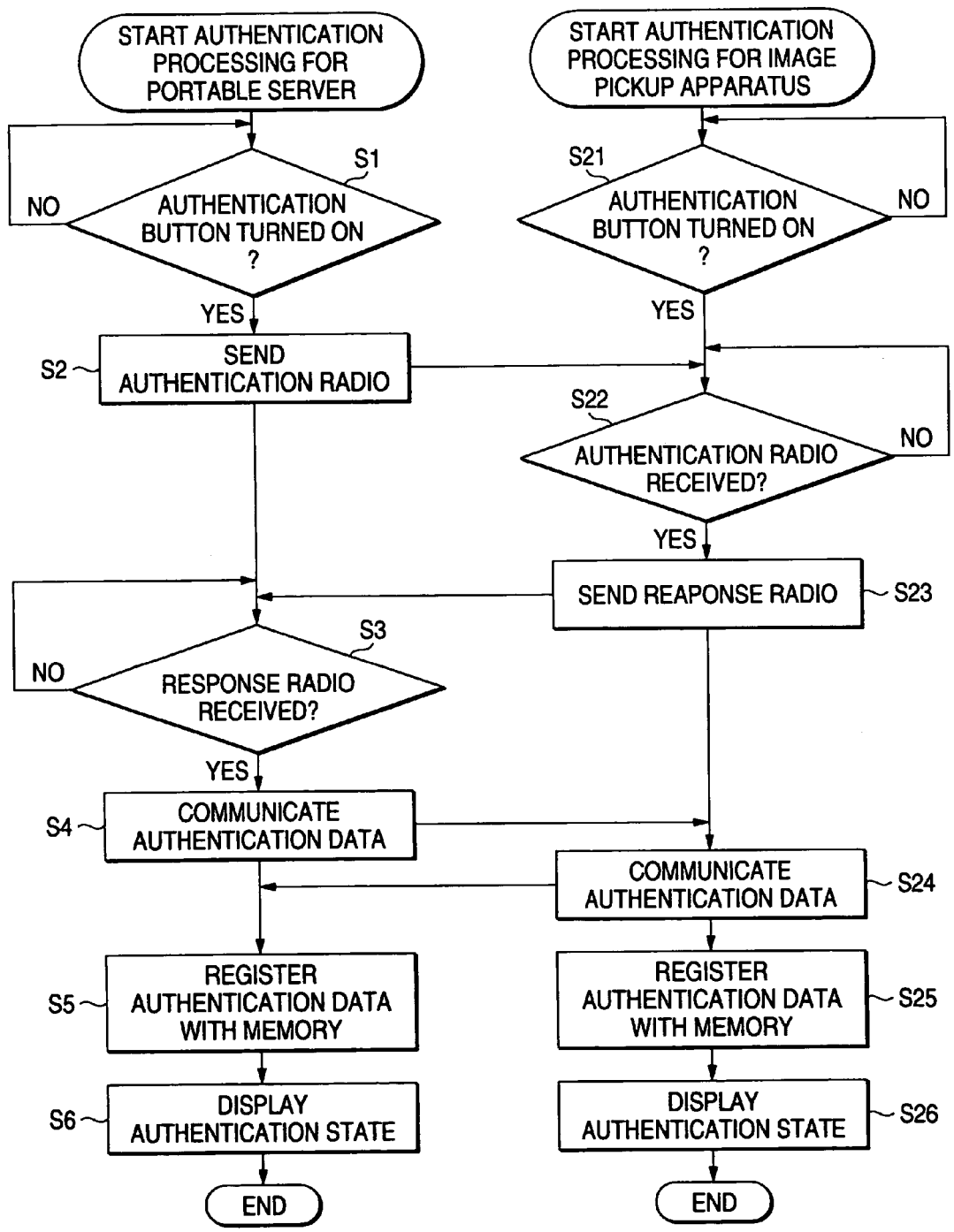
FIG. 12 is a flowchart illustrating authentication processing for the radio communication system in FIG. 1.

Next, the authentication processing of a radio communication system will be described with reference to a flowchart in FIG. 12. The example in FIG. 12 illustrates the authentication processing relating to the portable server 1 and the image pickup apparatus 2.

In order to cause the portable server 1 to authenticate the image pickup apparatus 2, a user turns on the authentication button 41 of the portable server 1 and turns on the authentication button 161 of the image pickup apparatus 2. For example, when the authentication button 41 of the portable server 1 includes a cover switch, a user uncovers the switch by the first operation and turns the switch on by the second operation to turn on the authentication button 41. For example, when the authentication button 161 of the image pickup apparatus 2 includes a lockable rotational switch, a user may unlock the switch by the first operation and rotate the switch by the second operation to turn on the authentication button 161. Then, the user may bring the image pickup apparatus 2 and the portable server 1 close up to a distance (from several mm to several cm), which can receive radio sent by the authentication radio communicating portion 33 and the authentication radio communicating portion 144.

The authentication radio receivable range of the portable server 1 and image pickup apparatus 2 will be described with reference to FIGS. 13 and 14. In the example in FIGS. 13 and 14, the authentication antenna 12 is provided near an internal surface of the cabinet 11 of the portable server 1. In the example, the authentication antenna 102 is provided near an internal surface of the cabinet 101 of the image pickup apparatus 2.

Figure 13:
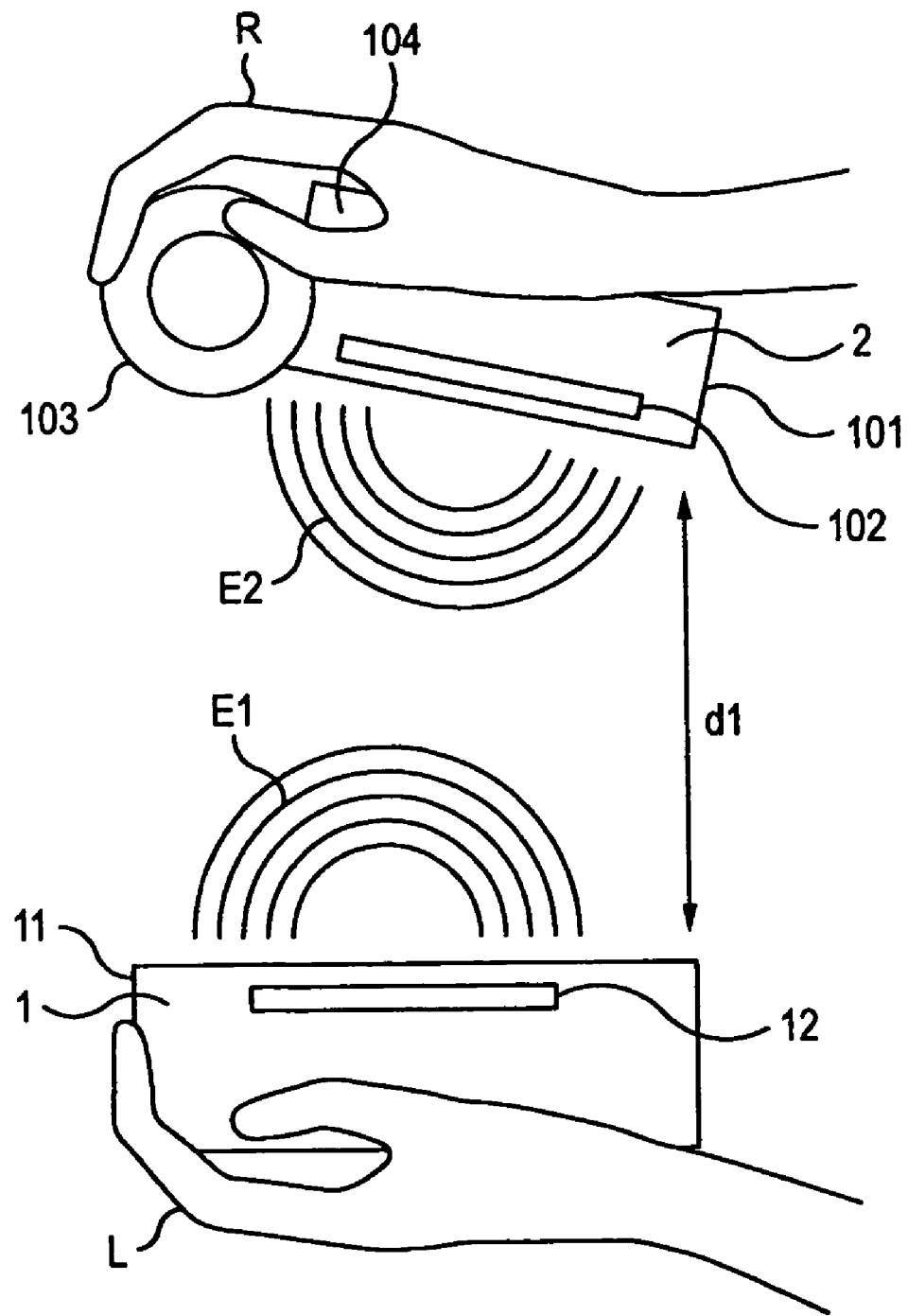
FIG. 13 is a diagram illustrating a receivable range in authentication of the radio communication system in FIG. 1.

In the example in FIG. 13, a user is holding, by the left hand L, the cabinet 11 of the portable server 1 with the authentication antenna 12 toward the right hand R (image pickup apparatus 2) side. Furthermore, the user is holding, by the right hand R, the cabinet 101 and camera portion 103 of the image pickup apparatus 2 with the authentication antenna 102 toward the left hand L (portable server 1) side. The display portion 104 of the image pickup apparatus 2 is folded and accommodated toward the cabinet 101.

In the example in FIG. 13, a distance d1 between the portable server 1 and the image pickup apparatus 2 is longer than a distance of several mm to several cm. The authentication antenna 12 of the portable server 1 is not included in a range E2 of a distance (of several mm to several cm) in which radio from the authentication antenna 12 of the portable server 1 can be received by the image pickup apparatus 2. Furthermore, the authentication antenna 102 of the image pickup apparatus 2 is not included in a range E1 of a distance (of several mm to several cm) in which radio from the authentication antenna 102 of the image pickup apparatus 2 is received by the portable server 1. Therefore, authentication processing does not start since the authentication radio communicating portion 33 of the portable server 1 and the authentication radio communicating portion 144 of the image pickup apparatus 2 do not receive radio from each other.

Figure 14:
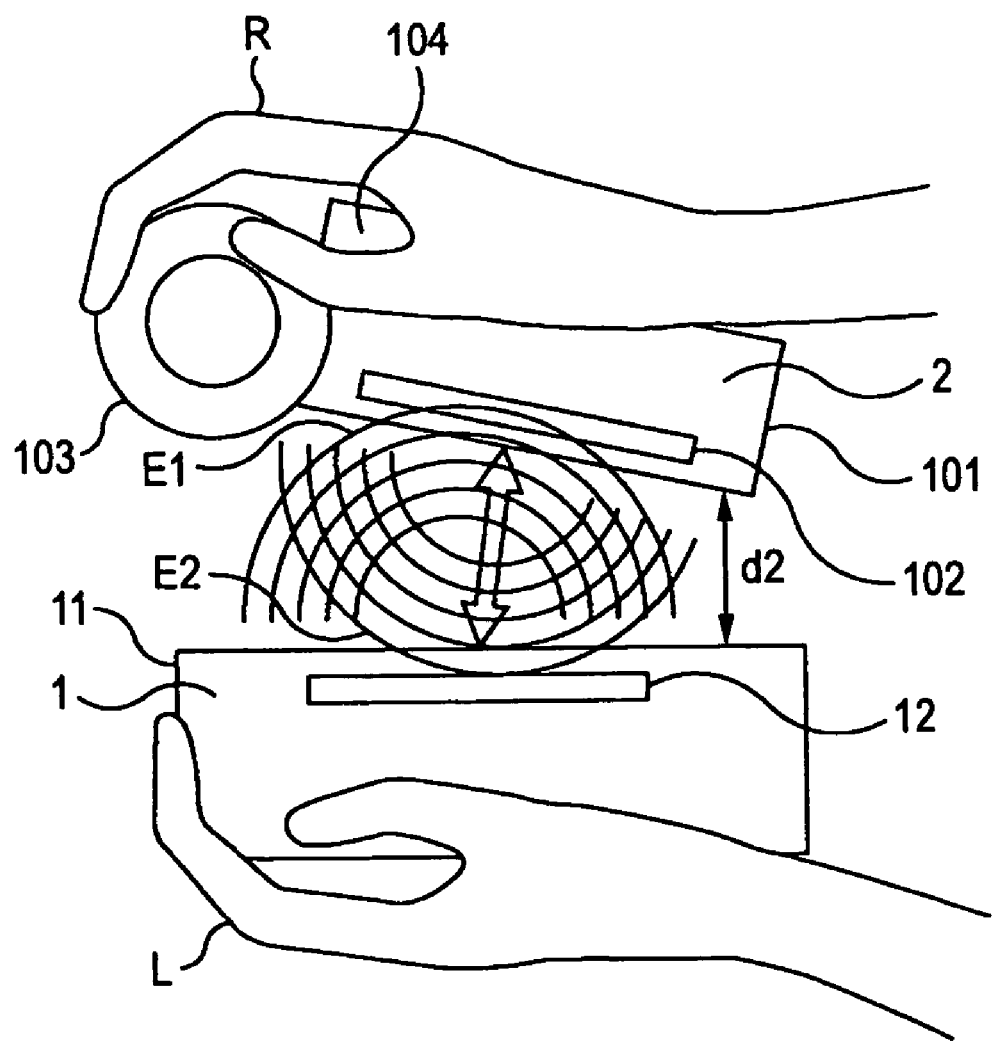
FIG. 14 is another diagram illustrating a receivable range in authentication of the radio communication system in FIG. 1.

Thus, as shown in FIG. 14, the user may bring the portable server 1 and the image pickup apparatus 2 closely up to a distance d2 in which the authentication antenna 12 of the portable server 1 is close to the authentication antenna 102 of the image pickup apparatus 2.

In the example in FIG. 14, the distance d2 between the portable server 1 and the image pickup apparatus 2 is shorter than a distance of the several mm to several cm. The authentication antenna 12 of the portable server 1 is included in the range E2 of a distance (of several mm to several cm) in which radio from the authentication antenna 12 of the portable server 1 can be received by the image pickup apparatus 2. Furthermore, the authentication antenna 102 of the image pickup apparatus 2 is included in the range E1 of a distance (of several mm to several cm) in which radio from the authentication antenna 102 of the image pickup apparatus 2 is received by the portable server 1. In other words, as indicated by the thick arrow, the authentication antenna 12 can receive radio from the authentication antenna 102, and the authentication antenna 102 can also receive radio from the authentication antenna 12. Therefore, subsequent processing is performed in the authentication radio communicating portion 33 of the portable server 1 and the authentication radio communicating portion 144 of the image pickup apparatus 2.

The ranges E1 and E2 may be a range of a same distance or may be ranges of different distances from several mm to several cm. However, in order to allow the bi-directional communication, the ranges E1 and E2 are preferably ranges of substantially the same distance.

At a step S1, the authentication control portion 61 of the portable server 1 waits until the authentication button 41 is turned on. When the authentication button 41 is turned on by a user's operation and it is determined that the authentication button 41 has been turned on, the processing goes to a step S2.

At the step S2, the authentication radio communicating portion 62 is controlled to send authentication radio communicable from several mm to several cm through the authentication antenna 12. Then, the processing goes to a step S3.

On the other hand, at a step S21, the authentication control portion 61 of the image pickup apparatus 2 also waits until the authentication button 161 is turned on. When the authentication button 161 is turned on by a user's operation and it is determined that the authentication button 161 has been turned on, the processing goes to a step S22. At the step S22, the authentication control portion 61 monitors the authentication radio communicating portion 62 and waits until the authentication radio communicating portion 62 receives authentication radio from the portable server 1.

As described above with reference to FIG. 14, since the authentication antenna 102 of the image pickup apparatus 2 exists in the range of the distance d2, which can receive radio from the authentication antenna 12 of the portable server 1, the authentication radio communicating portion 62 of the image pickup apparatus 2 receives authentication radio sent by the step S2 from the portable server 1 through the authentication antenna 102. At the step S22, in response to the reception of the authentication radio, the authentication control portion 61 of the image pickup apparatus 2 determines that the authentication radio communicating portion 62 has received the authentication radio from the portable server 1. Then, the processing goes to a step S23 where the authentication radio communicating portion 62 is controlled to send response radio to the received authentication radio to the portable server 1 through the authentication antenna 102. Then, the processing goes to a step S24.

At the step S3, the authentication control portion 61 of the portable server 1 monitors the authentication radio communicating portion 62 and waits until the authentication radio communicating portion 62 receives response radio to the authentication radio. As described above with reference to FIG. 14, since the authentication antenna 12 of the portable server 1 exists in the range of the distance d2, which can receive radio from the authentication antenna 102 of the image pickup apparatus 2, the authentication radio communicating portion 62 of the portable server 1 receives response radio sent by the step S23 from the image pickup apparatus 2 through the authentication antenna 12. At the step S3, in response to the reception of the response radio, the authentication control portion 61 of the portable server 1 determines that the authentication radio communicating portion 62 has received the response radio from the image pickup apparatus 2. Then, the processing goes to a step S4 where the authentication data communicating portion 63 is controlled to perform communication of authentication data through the authentication antenna 12, that is, to perform authentication processing for the image pickup apparatus 2. Then, the processing goes to a step S5.

When the authentication radio communicating portion 62 receives authentication data sent by the step S4 from the portable server 1, the authentication control portion 61 of the image pickup apparatus 2 controls the authentication data communicating portion 63 at the step S24 to cause the portable server 1 to perform communication of authentication data through the authentication antenna 102, that is, to perform authentication processing for the portable server 1 corresponding to the processing at the step S4 by the portable server 1. Then, the processing goes to a step S25.

The authentication processing will be specifically described below. In reality, the authentication control portion 61 of the portable server 1 controls the authentication data communicating portion 63 to request a product ID of the image pickup apparatus 2 through the authentication antenna 12. In response to the request, the authentication control portion 61 of the image pickup apparatus 2 controls the authentication data communicating portion 63 to send the product ID through the authentication antenna 102. The authentication control portion 61 of the portable server 1 creates a random number X, creates a first key from the random X and the product ID of the image pickup apparatus 2 having received through the authentication antenna 12 from the authentication data communicating portion 63 and creates a second key from the first key and the product ID of the image pickup apparatus 2. Furthermore, the authentication control portion 61 of the portable server 1 controls the authentication data communicating portion 63 to send the created random number X to the image pickup apparatus 2 through the authentication antenna 12. The authentication control portion 61 of the image pickup apparatus 2 creates a first key from the random X having been received from the authentication data communicating portion 63 through the authentication antenna 102 and the product ID of the image pickup apparatus 2 and further creates a second key from the first key and the product ID of the image pickup apparatus 2. Then, the authentication control portion 61 of the image pickup apparatus 2 controls the authentication data communicating portion 63 to send the first key and the second key as authentication code to the portable server 1 through the authentication antenna 102. In response to the transmission, the authentication control portion 61 of the portable server 1 compares the authentication code having been received from the authentication data communicating portion 63 through the authentication antenna 12 and the created second key. If the authentication code and the second key agree, the authentication control portion 61 of the portable server 1 controls the authentication data communicating portion 63 to send encryption key data to the image pickup apparatus 2 through the authentication antenna 12.

The authentication processing as described above is performed at the steps S4 and S24 so that the portable server 1 and the image pickup apparatus 2 are authenticated by each other. Thus, the portable server 1 and the image pickup apparatus 2 can obtain the product ID of the image pickup apparatus 2 and encryption key data as authentication data, which is information required for connection and communication between the portable server 1 and the image pickup apparatus 2 subsequent to the authentication.

Then, at the step S5, the authentication control portion 61 of the portable server 1 controls the authentication data registering portion 64 to register authentication data obtained by the reception or creation step with the memory 32. Then, at a step S6, an indicator in the output portion 38 is caused to display the authentication state indicating that the image pickup 2 has been authenticated in the portable server 1, and the authentication processing ends then.

On the other hand, at the step S25, the authentication control portion 61 of the image pickup apparatus 2 controls the authentication data registering portion 64 to register authentication data obtained by the reception or creation step with the memory 142. At a step S26, the display 111 is caused to display the authentication status indicating that the portable server 1 has been authenticated in the image pickup apparatus 2, and the authentication processing ends then.

Since the portable server 1 and the image pickup apparatus 2 are authenticated by each other as described above, a user having purchased a new apparatus only needs to turn on the authentication button and bring the apparatus and another apparatus to be authenticated closely so that the two apparatus can easily authenticate each other. Thus, the apparatus can be connected to an existing apparatus by radio. Furthermore, since authentication data is registered which is information required for connection and communication between the mutually authenticated portable server 1 and image pickup apparatus 2, the above-described authentication processing by bringing apparatus closely to an authentication-radio-receivable distance is not required, after the apparatus have been mutually authenticated once, for connection after authentication, which will be described later with reference to FIG. 15.

Furthermore, no authentication processing can be performed unless the authentication button 41 and the authentication button 161 are turned on. Thus, for example, in a crowded place such as a crowded train, the authentication can be suppressed for the portable server 1 in a bag by a third party through the bag. Furthermore, since authentication radio is not sent unless the authentication button or buttons are pressed, the power consumption can be reduced.

While, in the description above, the authentication buttons are turned on in two apparatus to be mutually authenticated to perform authentication processing, the authentication button may be only provided in one of the two apparatus (such as the portable server 1 having a data storage function).

Furthermore, the authentication button may include a soft switch along with a liquid crystal display and a touch panel. Also in this case, a user may operate the touch panel twice or more to display the authentication switch on the display (The number of times of operations must be kept below the number of times that do not place a load on a user). Thus, the same advantages can be attempted as those of the case where the authentication buttons are provided in cabinets. Furthermore, when a touch panel is used therefor, the waste in size and costs due to the provision of a special switch only for authentication can be suppressed.

Furthermore, while, in the description above, the portable server 1 sends authentication radio, the image pickup apparatus 2 may send authentication radio. Both of the portable server 1 and the image pickup apparatus 2 may send authentication radio separately, and one having received the sent authentication radio earlier may send response radio corresponding to the authentication radio.

While the repetitive description of the processing will be omitted herein, the same processing is performed between the portable server 1 and the portable viewer 3 or between the image pickup apparatus 2 and the portable viewer 3.

Figure 15:
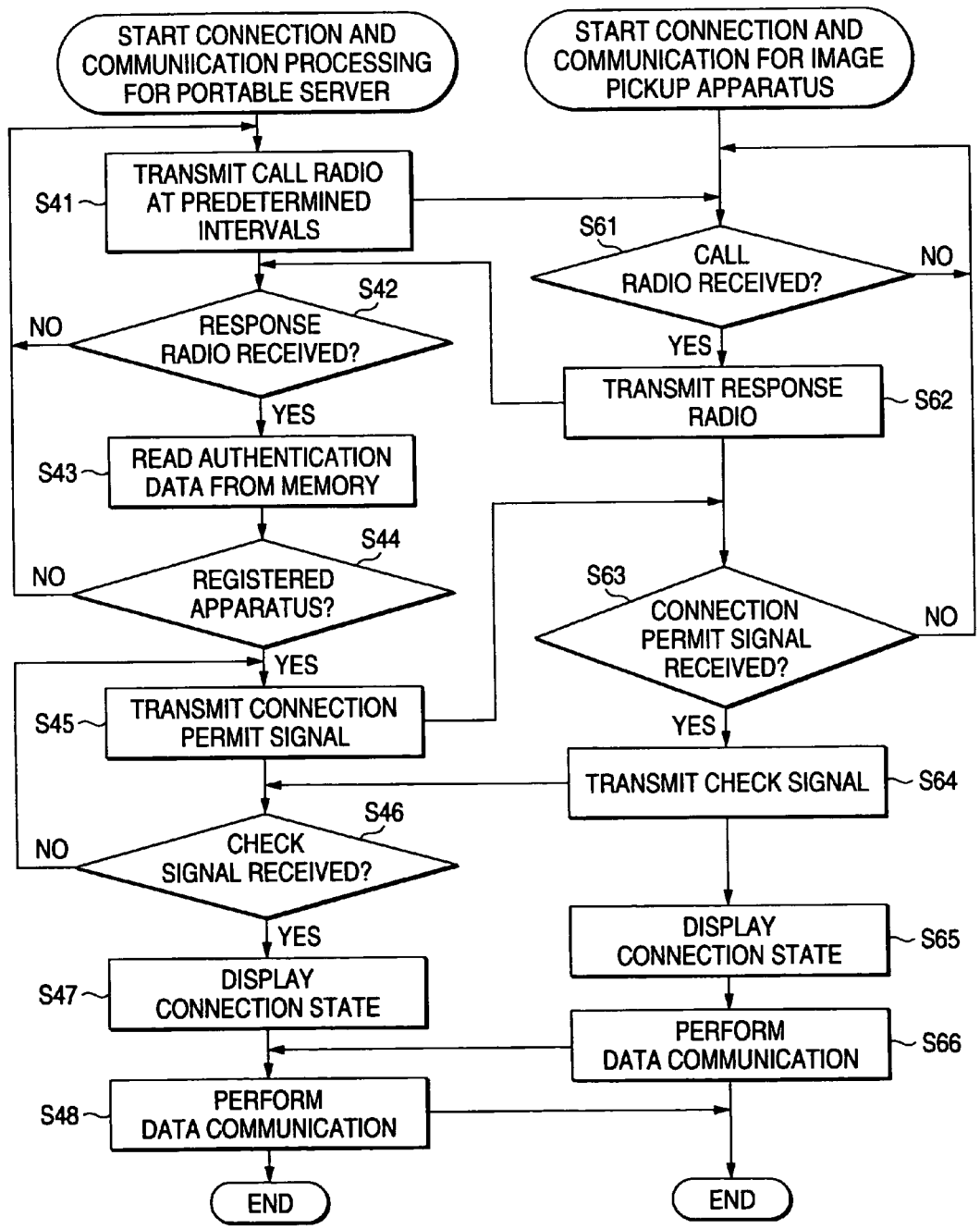
FIG. 15 is a flowchart illustrating connection and communication processing for the radio communication system in FIG. 1.

Next, connection and communication processing for radio communication systems having undergone the authentication processing as described above, that is, mutually authenticated radio communication systems will be described with reference to a flowchart in FIG. 15. The example in FIG. 15 illustrates a case where the image pickup apparatus 2 and the portable server 1 mutually authenticated by the authentication processing in FIG. 12 undergo the connection and communication processing.

The communication control portion 81 of the portable server 1 measures a time by using a clock contained therein and, at a step S41, controls the information transmitting portion 91 to transmit call radio at predetermined intervals through the antenna 35. Then, the processing goes to a step S42. The call radio is radio for checking whether or not a mutually authenticated apparatus exists within a range of several m to several tens of m, which is a distance in which the radio communicating portion 34 of the portable server 1 can receive the call radio. Notably, a direct operation (through a button, a touch panel or the like) by a user may trigger the transmission of call radio.

At a step S61, the communication control portion 81 of the image pickup apparatus 2 monitors the information receiving portion 92, and the information receiving portion 92 waits until call radio is received through the antenna 146. Since the call radio sent from the portable server 1 by the step S41 is received by the information receiving portion 92 of the image pickup apparatus 2, the communication control portion 81 determines that the information receiving portion 92 has received call radio through the antenna 146. At a step S62, the information transmitting portion 91 is controlled to send response radio to the received call radio through the antenna 146, and the processing goes to a step S63. More specifically, at the step S62, the communication control portion 81 of the image pickup apparatus 2 controls the authentication data loading portion 83 to load authentication data to be used for communication with the portable server 1 having sent the call radio from the memory 142 and encrypt the response radio to the call radio by using the loaded authentication data (encryption key data). Then, the communication control portion 81 controls the information transmitting portion 91 to transmit the encrypted response radio through the antenna 146.

At the step S42, the communication control portion 81 of the portable server 1 monitors the information receiving portion 92 and judges whether the information receiving portion 92 has received response radio corresponding to the call radio through the antenna 35 or not. If the communication control portion 81 determines that the information receiving portion 92 has not received the response radio through the antenna 35, the processing returns to the step S41. Then, the step S41 and subsequent steps are performed again.

When the response radio sent by the step S62 from the image pickup apparatus 2 is received by the information receiving portion 92 of the portable server 1, the communication control portion 81 of the portable server 1 determines that the information receiving portion 92 has received the response radio through the antenna 35 at the step S42 in response to the reception. At the step S43, the communication control portion 81 controls the authentication data loading portion 83 to load authentication data to be used for communication with the image pickup apparatus 2 having sent the response radio from the memory 32 and decodes the received response radio by using the loaded authentication data (encryption key data). Then, at a step S44, the communication control portion 81 judges whether the response radio having been decoded by using the registered authentication data can be loaded or not, that is, whether the apparatus having sent the response radio is an apparatus registered with the memory 32 (that is, authenticated apparatus) or not.

For example, when a failure occurs during the reception of the response radio or when radio has received from an unauthenticated apparatus, that is, when the response radio having been decoded by using the registered authentication data cannot be loaded, the apparatus having sent the response radio is determined as an apparatus not registered with the memory 32 at the step S44. Then, the communication control portion 81 of the portable server 1 returns to the step S41, and the step S41 and subsequent processing are repeated. In other words, at the step S41, the communication control portion 81 of the portable server 1 measures a time by using a clock contained therein and controls the information transmitting portion 91 to transmit call radio at predetermined intervals through the antenna 12. Then, the subsequent steps are performed again. Thus, radio from unauthenticated apparatus are not allowed to connect by the portable server 1.

Since radio communication may be performed in a public space in many cases, the connection and communication processing after authentication preferably is not intercepted by a third party. The processing at the step S42 and subsequent steps relating to the portable server 1 and communication processing at the step S62 and subsequent steps relating to the image pickup apparatus 2 are performed by using an encryption method such as IEEE 802.1 X/EAP. Therefore, the encryption and decoding as described above are performed at the steps S44 and S62 in the transmission and reception at the steps S45 and subsequent steps and at the step S63 and subsequent steps, the description of which will be omitted.

On the other hand, at a step S44, if the response radio decoded with registered authentication data can be loaded, the communication control portion 81 of the portable server 1 determines that an apparatus having sent response radio is an apparatus registered with the memory 32. At a step S45, the communication control portion 81 controls the information transmitting portion 91 to send a connection permit signal through the antenna 35. Then, the processing goes to a step S46.

On the other hand, at a step S63, the communication control portion 81 of the image pickup apparatus 2 monitors the information receiving portion 92 and judges whether a connection permit signal has been received thereby through the antenna 146. If the communication control portion 81 determines that the information receiving portion 92 has received a connection permit signal through the antenna 146, the communication control portion 81 controls the information transmitting portion 91 to send a check signal corresponding to the connection permit signal at the step S64. Then, the processing goes to a step S65.

If, at a step S63, the communication control portion 81 of the image pickup apparatus 2 determines that the information receiving portion 92 has not received a connection permit signal through the antenna 146, the processing returns to the step S61. Then, the step S61 and subsequent steps are performed again.

At the step S65, the communication control portion 81 of the image pickup apparatus 2 causes the display 111 to display the connection state indicating that the portable server 1 is being connected to the image pickup apparatus 2. Then, the processing goes to a step S66. A user may check that the portable server 1 is being connected thereto with reference to the connection state displayed on the display 111, manipulate the control button 112 and send video data to the portable server 1, for example. Thus, at the step S66, the communication control portion 81 of the image pickup apparatus 2 controls the data communicating portion 84 to perform data communication processing with the portable server 1. Then, the connection and communication processing ends here.

On the other hand, at the step S46, the communication control portion 81 of the portable server 1 monitors the information receiving portion 92 and judges whether the check signal corresponding to the connection permit signal has been received thereby through the antenna 35 or not. If the communication control portion 81 determines that the information receiving portion 92 has not received the check signal through the antenna 35, the processing returns to the step S45. Then, the step S45 and subsequent steps are performed again. Since, the check signal is sent from the image pickup apparatus 2 at the step S64, the communication control portion 81 of the portable server 1 determines that the information receiving portion 92 has received the check signal through the antenna 35 at the step S46. Then, at a step S47, an indicator in the output portion 38 is caused to display the connection state indicating that the image pickup apparatus 2 is being connected to the portable server 1. Then, the processing goes to a step S48.

Since, at the step S66, the image pickup apparatus 2 performs data communication processing and sends data, the data communicating portion 84 of the portable server 1 receives the data. At a step S48, in response to the data reception, the communication control portion 81 of the portable server 1 controls the data communicating portion 84 to perform data communication processing with the image pickup apparatus 2. Then, the connection and communication processing ends.

In this way, data communication is performed after mutual authentication and after connection processing by a radio communicating portion is performed to check connection. Therefore, no authentication processing is required by an authentication radio communicating portion having a limited receivable range of a shorter distance than that of the radio communicating portion. Thus, apparatus to be authenticated do not have to be brought closely for every authentication, which allows the communication in a receivable range of a longer distance than that of authentication.

The effective period of mutual authentication (that is, a period in which the connection processing in FIG. 15 can be performed without mutual authentication again) is the most preferably semipermanent after one authentication as described above in order to minimize the complexity in user's operations. However, the encryption in communication is also fixed permanently for each apparatus. Therefore, for connection requiring high degree of security, apparatus may request re-authentication for every connection or at predetermined intervals (such as every 24 hours). As a result, further security protection can be attempted between apparatus to be connected.

While, in the description above, the portable server 1 sends call radio, the image pickup apparatus 2 may send call radio. Alternatively, both of the portable server 1 and the image pickup apparatus 2 may send call radio, and one having received the sent call radio earlier may send response radio corresponding to the call radio.

Alternatively, in response to a user's operation on a control button, for example, the portable server 1 or the image pickup apparatus 2 may send call radio. In this case, no call radio is transmitted unless a user commands the transmission. Thus, the power consumption can be reduced.

The above-described processing, is performed similarly between the portable server 1 and the portable viewer 3 or between the image pickup apparatus 2 and the portable viewer 3, the repetitive description of which will be omitted here.

Figure 16:
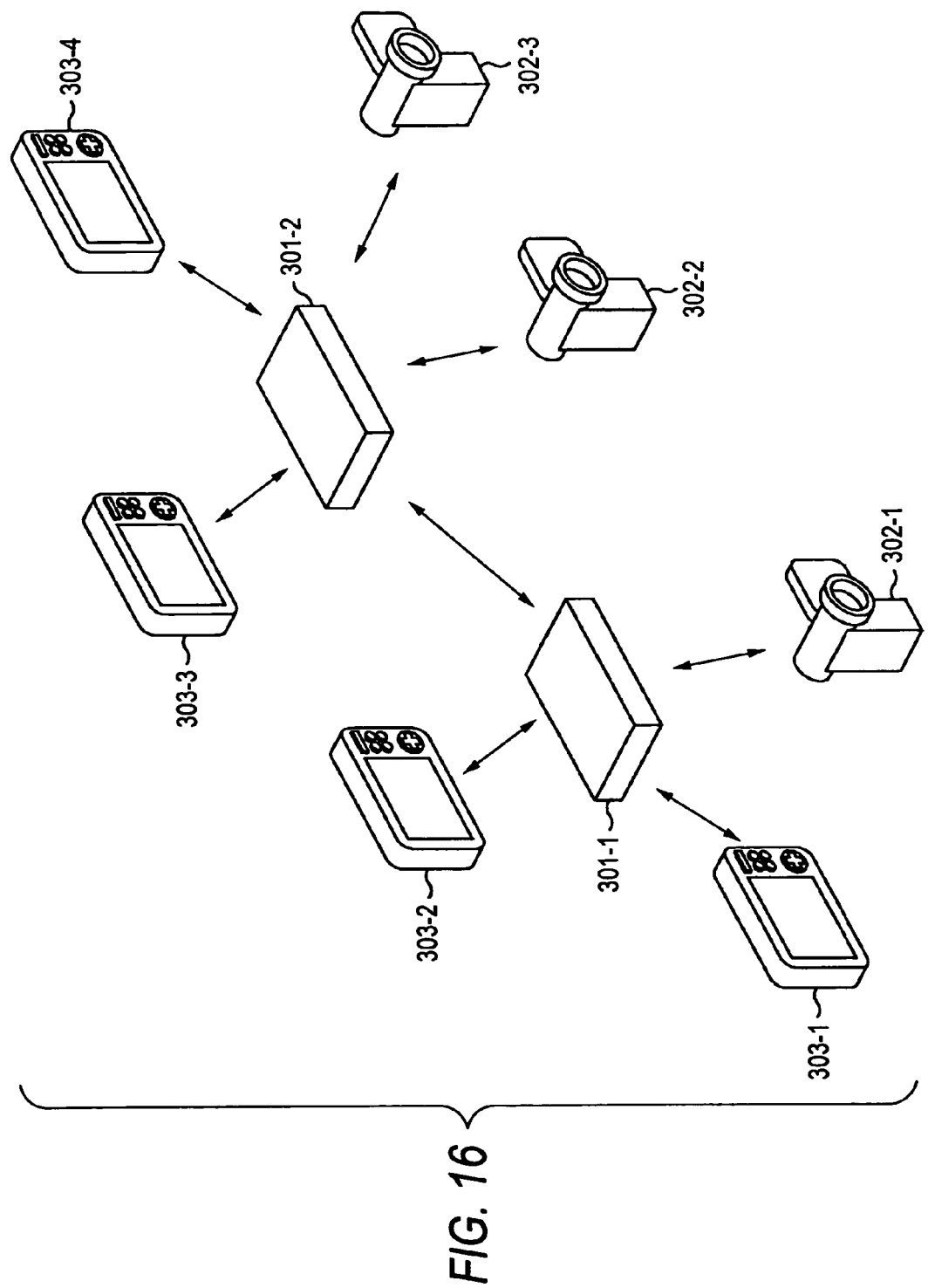
FIG. 16 is a diagram showing another construction example of a radio communication system of the invention.

FIG. 16 shows another construction example of the radio communication system in FIG. 1. In FIG. 16, a portable server 301-1 and portable server 301-2 are connected to each other. An image pickup apparatus 302-1 and portable viewers 303-1 and 303-2 are also connected to the portable server 301-1. Image pickup apparatus 302-2 and 302-3 and portable viewers 303-3 and 303-4 are connected to the portable server 301-2. In other words, the radio communication system in FIG. 16 includes a hub—oriented radio network with respect to the portable servers 301-1 and 301-2.

In following descriptions, the portable servers 301-1 and 301-2, the image pickup apparatus 302-1 to 302-3 and the portable viewers 303-1 to 303-4 are called portable servers 301, image pickup apparatus 302 and portable viewers 303, respectively, if they do not have to be dealt separately.

Each of the portable servers 301 has basically the same construction as that of the portable server 1 in FIG. 1, the repetitive detail description of which will be omitted here. The portable server 301 is an information processing apparatus, which is a portable and wireless home server centrally managing video data at user's home and has a main storage function for each of the image pickup apparatus 302 and the portable viewers 303. Each of the image pickup apparatus 302 has basically the same construction as that of the image pickup apparatus 2 in FIG. 1, the repetitive detail description of which will be omitted here. The image pickup apparatus 302 encodes images imaged by a user to MPEG2, for example, and sends the encoded image data to the portable server 301. Each of the portable viewers 303 has basically the same construction as that of the portable viewer 3 in FIG. 1, the repetitive detail description of which will be omitted here. The portable viewer 303 reconstruct video data stored in the portable server 301 and displays the reconstructed images on a display contained in the portable viewer 303. Notable, voice data is also omitted in the example in FIG. 16.

In this radio communication system, like the radio communication system in FIG. 1, each of the portable servers 301, image pickup apparatus 302 and portable viewers 303 has two communicating portions including an authentication radio communicating portion and a radio communicating portion, an authentication antenna to be used by the authentication radio communicating portion and an authentication button to be used by a user for causing each of the apparatus to perform authentication.

Therefore, when a user needs the portable server 301-1 and the portable server 301-2 to authenticate each other, the user may press the respective authentication buttons of the portable server 301-1 and portable server 301-2 and bring the portable server 301-1 and the portable server 301-2 close to a range of a communicable distance of the authentication antennas thereof. In response to a user's operation, authentication processing is performed by the authentication radio communicating portions in the portable server 301-1 and portable server 301-2 in the same manner as that of the authentication processing having described with reference to FIG. 12. Then, the portable server 301-1 and the portable server 301-2 can be mutually authenticate.

The authentication processing is also performed between the portable server 301-1 and the image pickup apparatus 302-1 and between the portable viewers 303-1 and 303-2 so that the portable server 301-1, the image pickup apparatus 302-1 and the portable viewers 303-1 and 303-2 can be mutually authenticated. Therefore, the image pickup apparatus 302-1 and the portable viewers 303-1 and 303-2 can subsequently perform connection and communication processing through the portable server 301-1 and radio communicating portions in the same manner as that of the connection and communication processing having described with reference to FIG. 15.

In the same manner, the authentication processing is also performed among the portable server 301-2, the image pickup apparatus 302-2 and 302-3 and the portable viewers 303-3 and 303-4 so that the portable server 301-2, the image pickup apparatus 302-2 and 302-3 and the portable viewers 303-3 and 303-4 can be mutually authenticated. Therefore, the image pickup apparatus 302-2 and 302-3 and the portable viewers 303-3 and 303-4 can subsequently perform connection and communication processing through the portable server 301-2 and radio communicating portions in the same manner as that of the connection and communication processing having described with reference to FIG. 15.

Therefore, in the radio communication system in FIG. 16, the image pickup apparatus 302-1 and portable viewer 303-1 connecting to the portable server 301-1 are connected to communicate through the portable server 301-1. In other words, the connection and communication processing having described with reference to FIG. 15 is performed between the portable server 301-1 and the image pickup apparatus 302-1 and is further performed between the portable server 301-1 and the portable viewer 303-1. Thus, data communication can be performed between the image pickup apparatus 302-1 and the portable viewer 303-1 through the portable server 301-1. In this case, the data communication may be performed in realtime or may be performed after buffered in a hard disk in the portable server 301-1. For the realtime connection, the portable server 301-1 must have a function allowing the simultaneous connection of two or more lines.

Furthermore, for example, the image pickup apparatus 302-1 connecting to the portable server 301-1 and the portable viewer 303-3 connecting to the portable server 301-2 are connected to communicate through the portable server 301-1 and portable server 301-2. In other words, the connection and communication processing having described with reference to FIG. 15 is performed between the portable server 301-1 and the image pickup apparatus 302-1, between the portable server 301-2 and the portable viewer 303-3 and between the portable server 301-1 and the portable viewer 301-2. Thus, data communication can be performed between the image pickup apparatus 302-1 and the portable viewer 303-3 through the portable server 301-1 and the portable server 301-2.

As described above, in the radio communication system in FIG. 16, data communication can be performed between the image pickup apparatus 302-1 and the portable viewer 303-1 connecting to the portable server 301-1 through the portable server 301-1 without authentication processing therebetween. Furthermore, data communication can be performed between the image pickup apparatus 302-1 connecting to the portable server 301-1 and the portable viewer 303-3 connecting to the portable server 301-2 through the portable server 301-1 and the portable server 301-2 without authentication processing therebetween.

When many apparatus are connected to a radio communication system as described above and the apparatus can be connected to each other, the networking and authentication processing and management become significantly complicated as the number of connected apparatus increases. Accordingly, the radio communication system may have a radio network construction having the portable server 301 as a hub so that an increase in load relating to authentication on a user can be suppressed in that case.

While, in FIG. 16, the radio communication system includes a hub-oriented network, a radio communication system of the invention may have other kinds of network instead of the hub-oriented network. In this case, the apparatus can be advantageously freely connected to each other though authentication control becomes more complicated as described above as the number of apparatus connected thereto increases.

While, in the description above, portable servers, image pickup apparatus and portable viewers are used, the invention can be also applied to a portable terminal such as a mobile telephone, a personal computer, a PDA (Personal Digital Assistant), a digital still camera and a head phone stereo in addition to a portable server, an image pickup apparatus and a portable viewer. Furthermore, the invention can be also applied to other unportable servers (such as a home server).

The above-described series of processing can be performed by hardware and can be also performed by software. In a case with software, each of the portable server 1 in FIG. 3, the image pickup apparatus 2 in FIG. 8 and the portable viewer 3 in FIG. 11 may include an information processing apparatus 401 as shown in FIG. 17.

In FIG. 17, a CPU (Central Processing Unit) 411 executes different kinds of processing in accordance with a program stored in a ROM (Read-Only Memory) 412 or a program loaded from a storage portion 418 to a RAM (Random Access Memory) 413. The RAM 413 may further store data required by the CPU 411 for executing different kinds of processing.

The CPU 411, the ROM 412 and the RAM 413 are connected to each other through a bus 414. An input/output interface 415 is also connected to the bus 414.

An input portion 416 including a keyboard and/or a mouse, an output portion 417 including a display such as a CRT (Cathode Ray Tube) and an LCD (Liquid Crystal Display) and a speaker, the storage portion 418 including a hard disk and a communicating portion 419 including a modem and a terminal adapter are connected to the input/output interface 415. The communicating portion 419 performs communication processing through a network, not shown.

A drive 420 is also connected to the input/output interface 415 as required. A magnetic disk 421, an optical disk 422, a magneto-optical disk 423 or a semiconductor memory 424 may be attached to the drive 420 as required. Then, a computer program read therefrom is installed in the storage portion 418 as required.

When the series of processing is performed by software, a program included in the software may be installed from a network or a recording medium to a computer built in a specific hardware or a generic personal computer, for example, which can implement different functions in accordance with different programs therefor installed in the personal computer.

As shown in FIG. 17, the recording medium may include not only package media including a magnetic disk 421 (including a flexible disk), an optical disk 422 (including CD-ROM (Compact Disk-Read Only Memory) and a DVD (Digital Versatile Disk)), an magneto-optical disk 423 (including an MD (Mini-Disk) (trademark)) or a semiconductor memory 424, which stores a program and is to be distributed for providing the program to a user separately from the apparatus body but also a ROM 412, which stores a program and is to be built in the apparatus body in advance and be provided to a user as it is and a hard disk included in the storage portion 418.

In this specification, the steps shown in the flowcharts include processing to be sequentially performed in written order and processing to be performed not sequentially but in parallel or separately.

In this specification, the term, "system", refers to an entire equipment including multiple apparatus.

What is claimed is:

1. A communication system for communicating data, comprising:
   a first information processing apparatus, including
      a first radio communicating portion configured to
         judge whether authentication processing is performed for communication between the first information processing apparatus and a second information processing apparatus based on a user input user's operation,
         perform the authentication processing, when authentication processing is performed and the second information processing apparatus is within a range of a communicable distance of the first radio communicating portion in the first information processing apparatus,
         register authentication data, obtained from the authentication processing, said authentication data being required for communication between the second information processing apparatus and the first information processing apparatus, and
      a second communicating portion configured to
         communicate data with the second information processing apparatus, based on the registered authentication data, said second radio communicating portion having a longer communicable distance than that of the first radio communicating portion; and
   the second information processing apparatus, including
      a third radio communicating portion configured to
         perform authentication processing, when the first information processing apparatus is within a range of a communicable distance of the third radio communicating portion in the second information processing apparatus,
         register authentication data, obtained from the authentication processing, said authentication data being required for communication between the first information processing apparatus, and the second information processing apparatus, and
      a fourth radio communicating portion configured to
         communicate data with the first information processing apparatus, based on the registered authentication data, said fourth radio communicating portion having a longer communicable distance than that of the third radio communicating portion.

2. A communication system according to claim 1, further comprising:
   an operation input unit in the first information processing apparatus, said operation input unit being configured to perform authentication processing in accordance with the user input, and wherein
   said first information processing apparatus is configured to judge whether authentication processing is performed based on operation information input through the operation input unit.

3. A communication system according to claim 1, wherein the second information processing apparatus is configured to judge whether authentication processing is performed based on a user input, and
   perform authentication processing using the third radio communicating portion, when authentication processing is performed and the first information processing apparatus is within a range of a communicable distance of the third radio communicating portion.

* * * * *

UNITED STATES PATENT AND TRADEMARK OFFICE
CERTIFICATE OF CORRECTION

PATENT NO. : 7,499,549 B1  Page 1 of 1
APPLICATION NO. : 10/948204
DATED : March 3, 2009
INVENTOR(S) : Shin Iima et al.

It is certified that error appears in the above-identified patent and that said Letters Patent is hereby corrected as shown below:

On the Title page, item (75)

The first inventor's name should read -- Shin Iima --.

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

PATENT NO.        : 7,499,549 B2
APPLICATION NO.   : 10/948204
DATED             : March 3, 2009
INVENTOR(S)       : Shin Iima et al.

It is certified that error appears in the above-identified patent and that said Letters Patent is hereby corrected as shown below:

IN THE CLAIMS:
In Claim 1, Column 25, Lines 56-57, delete: "user's operation".

Signed and Sealed this

Second Day of November, 2010

David J. Kappos
*Director of the United States Patent and Trademark Office*